(12) United States Patent
Liu et al.

(10) Patent No.: US 7,834,875 B2
(45) Date of Patent: Nov. 16, 2010

(54) METHOD AND SYSTEM FOR AUTOMATICALLY ASSEMBLING STREAM PROCESSING GRAPHS IN STREAM PROCESSING SYSTEMS

(75) Inventors: Zhen Liu, Tarrytown, NY (US); Anand Ranganathan, Stamford, CT (US); Anton V. Riabov, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 11/695,487

(22) Filed: Apr. 2, 2007

(65) Prior Publication Data

US 2008/0238923 A1    Oct. 2, 2008

(51) Int. Cl.
*G09T 11/20* (2006.01)
(52) U.S. Cl. .................................................. 345/440
(58) Field of Classification Search ................. 345/440
See application file for complete search history.

(56) References Cited

U.S. PATENT DOCUMENTS

| | | | |
|---|---|---|---|
| 5,675,786 A | 10/1997 | McKee et al. | |
| 2004/0073545 A1* | 4/2004 | Greenblatt et al. | 707/3 |
| 2004/0138936 A1 | 7/2004 | Johnson et al. | |
| 2005/0021548 A1 | 1/2005 | Bohannon et al. | |
| 2006/0212855 A1* | 9/2006 | Bournas et al. | 717/140 |
| 2007/0023515 A1 | 2/2007 | Urken | |
| 2007/0198971 A1* | 8/2007 | Dasu et al. | 717/140 |
| 2008/0120129 A1* | 5/2008 | Seubert et al. | 705/1 |
| 2008/0243449 A1* | 10/2008 | Feblowitz et al. | 703/2 |
| 2008/0250390 A1* | 10/2008 | Feblowitz et al. | 717/114 |
| 2008/0288595 A1* | 11/2008 | Liu et al. | 709/206 |
| 2010/0191521 A1 | 7/2010 | Huet et al. | |

OTHER PUBLICATIONS

M. Sullivan. Tribeca: A stream database manager for network traffic analysis. In Proc. of the 22nd Intl. Conf. on Very Large Data Bases, Sep. 1996.

M. LeLarge, Z. Liu, and A. Riabov. Automatic composition of secure workflows. In ATC-06, 2006.

J. Ambite and C. Knoblock. Flexible and scalable query planning in distributed and heterogeneous environments. In AIPS'98, Jun. 1998.

H.Wang and C. Zaniolo: ATLaS: A Native Extension of SQL for Data Mining and Stream Computations, UCLA CS Dept., Technical Report, Aug. 2002.

M. A. Hammad, W. G. Aref, and A. K. Elmagarmid. Stream window join: Tracking moving objects in sensor-network databases. In Proc. of the 15th SSDBM Conference, Jul. 2003.

(Continued)

*Primary Examiner*—Javid A Amini
(74) *Attorney, Agent, or Firm*—Chau & Associates, LLC

(57) ABSTRACT

A method for assembling stream processing graphs in a stream processing system, includes: performing, in an offline manner, translating a plurality of processing element and data source descriptions into a planning language and performing reasoning on the plurality of processing element and data source descriptions during the translation; and performing, in an online manner, receiving a processing request that specifies a desired processing outcome; translating the processing request into a planning goal; and assembling a plurality of stream processing graphs, each of the processing graphs including a plurality of the translated and reasoned processing elements or data sources that satisfy the desired processing outcome.

31 Claims, 15 Drawing Sheets

OTHER PUBLICATIONS

C. Cranor et al. Gigascope: A stream database for network applications. In SIGMOD, 2003.

S. Chandrasekaran et al. TelegraphCQ: Continuous Dataflow Processing for an Uncertain World. CIDR, 2003.

D. J. Abadi, et al: Aurora: a new model and architecture for data stream management. VLDB J, 12(2): 120-139 (2003).

L'ecu'e, F., L'eger, A.: A formal model for semantic web service composition. In: ISWC. (2006).

B. Parsia and E. Sirin. Pellet: An OWL DL reasoner. In the Semantic Web—ISWC 2004, 2004.

N. Jain et al. Design, implementation, and evaluation of the linear road benchmark on the stream processing core. In SIGMOD'06, Jun. 2006.

A. Riabov, Z. Liu, Planning for Stream Processing Systems, in Proceedings of AAAI-2005, Jul. 2005.

Y. Gil,, E. Deelman, J. Blythe, C. Kesselman, and H. Tangmunarunkit. Artificial intelligence and grids: Workflow planning and beyond. IEEE Intelligent Systems, Jan. 2004.

D. B. Terry et al. Continuous queries over append-only databases. In SIGMOD, pp. 321-330, 1992.

C-N Hsu and C. A. Knoblock. Semantic query optimization for query plans of heterogeneous multi-database systems, IEEE Transactions on Knowledge and Data Engineering, 12(6):959-978, Nov./Dec. 2000.

A. Arasu, S. Babu, J. Widom. The CQL continuous query language: Semantic foundations and query execution. Technical Report 2003-67, Stanford University, 2003.

D.J. Abadi et al. The Design of the Borealis Stream Processing Engine (CIDR), Jan. 2005, Asilomar, CA.

Traverso, P., Pistore, M.: Automated composition of semantic web services into executable processes. In: ISWC. (2004).

Narayanan, S., McIlraith, S.: Simulation, verification and automated composition of web services. In: WWW. (2002).

Heflin, J., Munoz-Avila, H.: Low-based agent planning for the semantic web. In: Ontologies and the Semantic Web, 2002 AAAI Workshop.

Zhou, J., Ma, L., Liu, Q., Zhang, L., Yu, Y., Pan, Y.: Minerva: A scalable OWL ontology storage and inference system. In: 1st Asian Semantic Web Symp. (2004).

H. Knublaugh, M. A. Musen, and A. L. Rector. Editing description logic ontologies with the protege owl plugin. Whistler, BC, Canada, 2004.

M. Stonebraker, U. Cetintemel, S.B. Zdonik: The 8 requirements of real-time stream processing. SIGMOD Record 34(4): 42-47 (2005).

Sheshagiri, M., desJardins, M., Finin, T.: A planner for composing services described in DAML-S. In: Web Services and Agent-based Engineering—AAMAS'03, Jun. 30, 2003, pp. 1-5.

Sirin, E., Parsia, B.: Planning for Semantic Web Services. In: Semantic Web Services Workshop at 3rd ISWC, Dec. 15, 2003, pp. 1-15.

R. Ginis, R. Strom: An Autonomic Messaging Middleware with Stateful Stream Transformation, Proceedings of the International Conference on Autonomic Computing (ICAC'04), May 17, 2004, pp. 1-3.

Grosof, B., Horrocks, I., Volz, R., Decker, S.: Description logic programs: combining logic programs with description logic. In: WWW'03, May 20, 2003, pp. 48-57.

* cited by examiner

1200

| Experiment 1 | | | | Experiment 2 | | |
|---|---|---|---|---|---|---|
| PEs | Streams | Prereason | Plan | PEs | Prereason | Plan |
| 10 | 15 | 4.66 | 0.15 | 27 | 13.99 | 0.24 |
| 20 | 40 | 10.29 | 0.22 | 42 | 25.01 | 0.69 |
| 30 | 119 | 27.49 | 0.76 | 72 | 47.21 | 1.74 |
| 40 | 190 | 38.48 | 1.21 | 102 | 67.48 | 3.06 |
| 50 | 288 | 59.17 | 2.26 | 162 | 107.88 | 7.75 |
| 100 | 1,204 | 233.03 | 28.73 | 312 | 224.85 | 29.20 |

|  | JLL | JSC | DSI ... | TOTAL |
|---|---|---|---|---|
| Classes | 18 | 20 | 5 | 259 |
| Individual | 25 | 33 | 3 | 584 |
| Datatype Properties | 3 | 4 | 2 | 41 |
| Object Properties | 14 | 17 | 2 | 90 |
| Annotation Properties | 1 | 1 | 0 | 4 |

FIG. 14

METHOD AND SYSTEM FOR AUTOMATICALLY ASSEMBLING STREAM PROCESSING GRAPHS IN STREAM PROCESSING SYSTEMS

GOVERNMENT INTERESTS

This invention was made with Government support under Contract No.: H98230-05-3-0001 awarded by the U.S. Department of Defense. The Government has certain rights in this invention.

RELATED APPLICATIONS

This application is related to: commonly assigned U.S. application entitled "METHOD AND SYSTEM FOR ASSEMBLING INFORMATION PROCESSING APPLICATIONS BASED ON DECLARATIVE SEMANTIC SPECIFICATIONS", Ser. No. 11/695,238, filed concurrently herewith and incorporated by reference herein in its entirety; commonly assigned U.S. application entitled "METHOD FOR SEMANTIC MODELING OF STREAM PROCESSING COMPONENTS TO ENABLE AUTOMATIC APPLICATION COMPOSITION", Ser. No. 11/695,457, filed concurrently herewith and incorporated by reference herein in its entirety; commonly assigned U.S. application entitled "METHOD FOR DECLARATIVE SEMANTIC EXPRESSION OF USER INTENT TO ENABLE GOAL-DRIVEN STREAM PROCESSING", Ser. No. 11/695,430, filed concurrently herewith and incorporated by reference herein in its entirety; commonly assigned U.S. application entitled "METHOD AND SYSTEM FOR AUTOMATICALLY ASSEMBLING PROCESSING GRAPHS IN INFORMATION PROCESSING SYSTEMS", Ser. No. 11/695,487, filed concurrently herewith and incorporated by reference herein in its entirety; commonly assigned U.S. application entitled "METHOD FOR MODELING COMPONENTS OF AN INFORMATION PROCESSING APPLICATION USING SEMANTIC GRAPH TRANSFORMATIONS", Ser. No. 11/695,311, filed concurrently herewith and incorporated by reference herein in its entirety; commonly assigned U.S. application entitled "METHOD FOR DECLARATIVE SEMANTIC EXPRESSION OF USER INTENT TO ENABLE GOAL-DRIVEN INFORMATION PROCESSING", Ser. No. 11/695,279, filed concurrently herewith and incorporated by reference herein in its entirety; and commonly assigned U.S. application entitled "METHOD AND SYSTEM FOR COMPOSING STREAM PROCESSING APPLICATIONS ACCORDING TO A SEMANTIC DESCRIPTION OF A PROCESSING GOAL", Ser. No. 11/695,410, filed concurrently herewith and incorporated by reference herein in its entirety.

BACKGROUND OF THE INVENTION

1. Technical Field

The present invention relates to assembling stream processing applications, and more particularly, to a method and system for automatically assembling stream processing graphs in stream processing systems.

2. Discussion of the Related Art

Stream processing applications ingest large volumes of streaming data from one or more sources, process it using a variety of components, and produce results that satisfy user queries.

Stream processing systems are needed in situations where source data is too voluminous to store and analyze. Such data, observed on high capacity streams, must be processed on-the-fly by stream processing applications in response to user queries. These applications are typically expressed as processing graphs (or workflows) of components that can extract meaningful information from mostly unstructured, streaming data. A processing graph is a stream-interconnected collection of data sources and processing elements (PEs). Data sources produce the (possibly unstructured) streaming data to be observed. PEs are deployable software components that can perform various kinds of operations on the data to produce new, derived data streams.

A key challenge for stream processing systems lies in the construction of processing graphs that can satisfy user queries. With many thousands of disparate data sources and PEs to choose from, we cannot expect the end-user to craft these graphs manually. These users are typically not skilled programmers, and they may not have knowledge of the functions performed by different components.

We can also not rely on programmers or experts to construct these graphs. With the large numbers of data sources and PEs to consider, the number of possible graphs is enormous. Different users can have different queries, requiring different graphs to be constructed. Thus, it is not feasible to pre-construct all possible graphs to satisfy the wide variety of end-user queries manually.

Also, for a given query, a number of alternative processing graphs can be assembled, each achieving a similar result, each consuming possibly different amounts of computational resources, and each producing different levels of quality. Depending on deployment-time resource utilization, a particular graph may not be deployable, but some alternate graph, consuming fewer resources at some sacrifice in result quality, might be deployable. Typically, however, users will not know how to construct the right graph to produce the highest quality result with resource limitations at deployment time.

SUMMARY OF THE INVENTION

In an exemplary embodiment of the present invention, a method for assembling stream processing graphs in a stream processing system, comprises: performing, in an offline manner, translating a plurality of processing element and data source descriptions into a planning language and performing reasoning on the plurality of processing element and data source descriptions during the translation; and performing, in an online manner, receiving a processing request that specifies a desired processing outcome; translating the processing request into a planning goal; and assembling a plurality of stream processing graphs, each of the processing graphs including a plurality of the translated and reasoned processing elements or data sources that satisfy the desired processing outcome.

Each of the processing element descriptions includes: an input message pattern that includes variables representing data objects that must be included in a message input to the processing element, and a graph pattern that semantically describes the data objects that must be included in the message input to the processing element; and an output message pattern that includes variables and new data objects, the variables and new data objects representing data objects that must be included in a message output from the processing element, and a graph pattern that semantically describes the data objects in the message output from the processing element.

Each of the data source descriptions includes an output message description that includes exemplar terms representing data objects that must be included in a message output from the data source, and a graph that semantically describes the data objects in the message output from the data source.

Assembling each of the stream processing graphs comprises matching a message output from a first processing element or a data source to an input message pattern of a second processing element if the message includes the data objects that must be included in a message input to the second processing element and if a graph that semantically describes data objects in the message satisfies the graph pattern that semantically describes the data objects that must be included in the message input to the second processing element.

The message is matched to the input message pattern of the second processing element by applying a pattern solution defined on all the variables in the graph pattern that semantically describes the data objects that must be included in the message input to the second processing element.

When applying the pattern solution, variables that are substituted in the graph pattern that semantically describes the data objects that must be included in the message input to the second processing element become a subset of the data objects in the output message pattern of the second processing element after matching the message to the second processing element.

A graph that is obtained after substituting the variables in the graph pattern that semantically describes the data objects that must be included in the message input to the second processing element is satisfied by the graph that semantically describes the data objects in the output message pattern of the second processing element after matching the message to the second processing element based on a logical derivation framework.

The method further comprises substituting variables representing configuration parameters of the second processing element by terms that satisfy constraints on the variables in variables in the graph pattern that semantically describes the data objects that must be included in the message input to the second processing element.

The method further comprises connecting the first processing element or the data source to the second processing element when the message is matched to the input message pattern of the second processing element.

The method further comprises generating an output message of the second processing element by applying differences between the graph pattern that semantically describes the data objects that must be included in the message input to the second processing element and the graph pattern that semantically describes the data objects that must be in an output message pattern of the second processing element to the graph that semantically describes the data objects in the message.

The method farther comprises adding and removing subgraphs from the message matched to the input message pattern of the second processing elements based on differences between the input message pattern of the second processing element and the output message pattern of the second processing element.

When a first stream processing graph of the plurality of stream processing graphs includes a first data source and a first processing element that satisfy the desired processing outcome and a second stream processing graph of the plurality of stream processing graphs includes the first data source and a second processing element that satisfies the desired processing outcome, the method further comprises selecting which of the first or second processing graphs is to be deployed in a stream processing system.

The stream processing graph to be deployed is selected based on Pareto optimality of the stream processing graph.

When a first stream processing graph of the plurality of stream processing graphs includes a first data source and a first processing element that satisfy the desired processing outcome and a second stream processing graph of the plurality of stream processing graphs includes a second data source and the first processing element that satisfy the desired processing outcome, the method further comprises selecting which of the first or second stream processing graphs is to be deployed in a stream processing system.

The stream processing graph to be deployed is selected based on Pareto optimality of the stream processing graph.

The reasoning is Description Logic (DL) reasoning.

In an exemplary embodiment of the present invention, a system for assembling stream processing graphs in a stream processing system, comprises: a memory device for storing a program; a processor in communication with the memory device, the processor operative with the program to: perform, in an offline manner, translating a plurality of processing element and data source descriptions into a planning language and performing reasoning on the plurality of processing element and data source descriptions during the translation; and perform, in an online manner, receiving a processing request that specifies a desired processing outcome; translating the processing request into a planning goal; and assembling a plurality of stream processing graphs, each of the processing graphs including a plurality of the translated and reasoned processing elements or data sources that satisfy the desired processing outcome.

Each of the processing element descriptions includes: an input message pattern that includes variables representing data objects that must be included in a message input to the processing element, and a graph pattern that semantically describes the data objects that must be included in the message input to the processing element; and in output message pattern that includes variables and new data objects, the variables and new data objects representing data objects that must be included in a message output from the processing element, and a graph pattern that semantically describes the data objects in the message output from the processing element.

Each of the data source descriptions includes an output message description that includes exemplar terms representing data objects that must be included in a message output from the data source, and a graph that semantically describes the data objects in the message output from the data source.

When assembling each of the stream processing graphs the processor is further operative with the program to match a message output from a first processing element or a data source to an input message pattern of a second processing element if the message includes the data objects that must be included in a message input to the second processing element and if a graph that semantically describes data objects in the message satisfies the graph pattern that semantically describes the data objects that must be included in the message input to the second processing element.

The message is matched to the input message pattern of the second processing element by applying a pattern solution defined on all the variables in the graph pattern that semantically describes the data objects that must be included in the message input to the second processing element.

When applying the pattern solution, variables that are substituted in the graph pattern that semantically describes the data objects that must be included in the message input to the second processing element become a subset of the data objects in the output message pattern of the second processing element after matching the message to the second processing element.

A graph that is obtained after substituting the variables in the graph pattern that semantically describes the data objects that must be included in the message input to the second processing element is satisfied by the graph that semantically describes the data objects in the output message pattern of the second processing element after matching the message to the second processing element based on a logical derivation framework.

The processor is further operative with the program to substitute variables representing configuration parameters of the second processing element by terms that satisfy constraints on the variables in variables in the graph pattern that semantically describes the data objects that must be included in the message input to the second processing element.

The processor is further operative with the program to connect the first processing element or the data source to the second processing element when the message is matched to the input message pattern of the second processing element.

The processor is further operative with the program to generate an output message of the second processing element by applying differences between the graph pattern that semantically describes the data objects that must be included in the message input to the second processing element and the graph pattern that semantically describes the data objects that must be in an output message pattern of the second processing element to the graph that semantically describes the data objects in the message.

The processor is further operative with the program to add and remove subgraphs from the message matched to the input message pattern of the second processing elements based on differences between the input message pattern of the second processing element and the output message pattern of the second processing element.

When a first stream processing graph of the plurality of stream processing graphs includes a first data source and a first processing element that satisfy the desired processing outcome and a second stream processing graph of the plurality of stream processing graphs includes the first data source and a second processing element that satisfies the desired processing outcome, the processor is further operative with the program to select which of the first or second processing graphs is to be deployed in a stream processing system.

The stream processing graph to be deployed is selected based on Pareto optimality of the stream processing graph.

When a first stream processing graph of the plurality of stream processing graphs includes a first data source and a first processing element that satisfy the desired processing outcome and a second stream processing graph of the plurality of stream processing graphs includes a second data source and the first processing element that satisfy the desired processing outcome, the processor is further operative with the program to select which of the first or second stream processing graphs is to be deployed in a stream processing system.

The stream processing graph to be deployed is selected based on Pareto optimality of the stream processing graph.

The reasoning is DL reasoning.

In an exemplary embodiment of the present invention, a computer program product comprising a computer useable medium having computer program logic recorded thereon for assembling stream processing graphs in a stream processing system, the computer program logic comprises: program code for performing, in an offline manner, translating a plurality of processing element and data source descriptions into a planning language and performing reasoning on the plurality of processing element and data source descriptions during the translation; and program code for performing, in an online manner, receiving a processing request that specifies a desired processing outcome; translating the processing request into a planning goal; and assembling a plurality of stream processing graphs, each of the processing graphs including a plurality of the translated and reasoned processing elements or data sources that satisfy the desired processing outcome.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

BRIEF DESCRIPTION OF THE DRAWINGS

FIG. 12 illustrates pre-reasoning and planning time according to an exemplary embodiment of the present invention;

FIG. 14 illustrates pre-reasoning and planning time for the stream processing graph of FIG. 13.

DETAILED DESCRIPTION OF EXEMPLARY EMBODIMENTS

In accordance with an exemplary embodiment of the present invention, an inquiry specification language (ISL), a language for specifying inquiries (i.e., semantically specified queries), and a compiler that assembles stream processing applications that produce results satisfying the inquiry specifications are provided.

In accordance with another exemplary embodiment of the present invention, a semantic model that captures the semantics of data on stream is provided. In this model, streams are described using semantic graphs formed by facts represented in Web Ontology Language (OWL), described in D. McGuinness and F. van Harmelen. OWL web ontology language overview. In W3C Recommendation, 2004, a copy of which is incorporated by reference herein in its entirety. OWL is one of the standard languages of the Semantic Web. This model is used to describe different data sources and PEs in terms of the semantics of the data they consume and produce. Users also frame inquiries based on this model. The compiler then uses reasoning based on Description Logic (DL), F. Baader, D. Calvanese, D. L. McGuinness. D. Nardi, and P. F. Patel-Schneider, editors. The Description Logic Handbook: Theory, Implementation, and Applications. Cambridge University Press, 2003, a copy of which is incorporated by reference herein in its entirety. The compiler also uses reasoning based on multi-objective optimization techniques to match inquiry goals to component capabilities, using inference where necessary to apply domain-specific results.

The compiler has been developed on top of the System S Stream Processing Core (SPC), described in N. Jain, L. Amini, H. Andrade, R. King, Y. Park. P. Selo, and C. Venkatramani. Design, implementation, and evaluation of the linear road benchmark on the stream processing core. In SIGMOD'06, June 2006, a copy of which is incorporated by reference herein in its entirety.

System Overview

Figure 1:
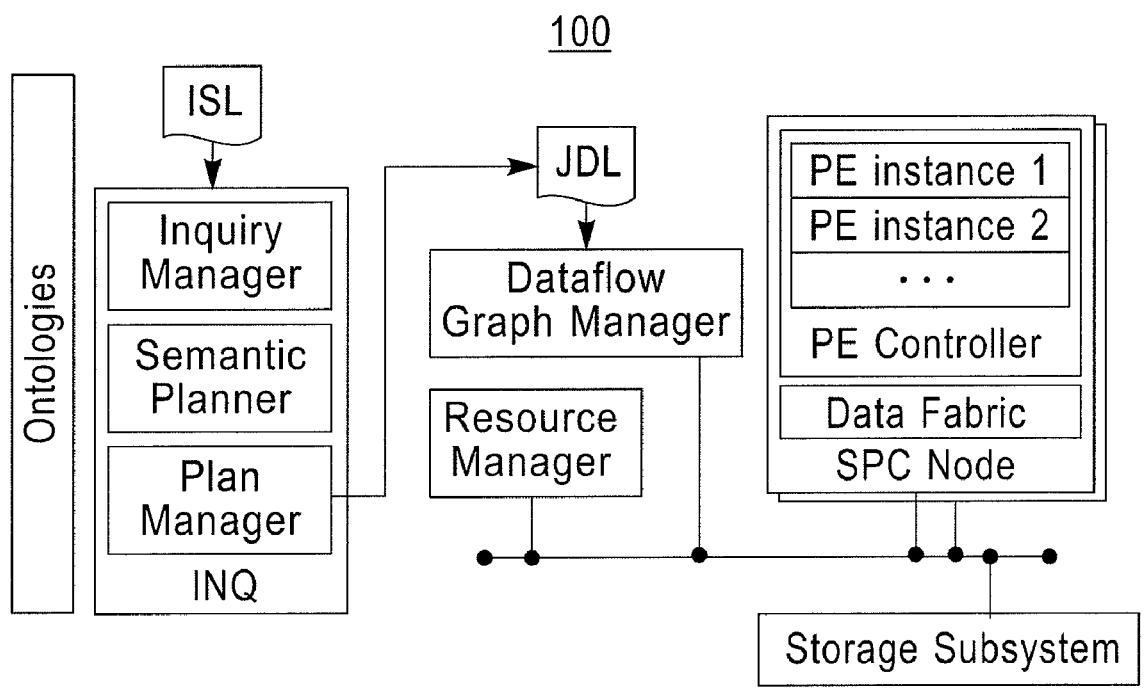
FIG. 1 illustrates a System S Stream Processing Core (SPC) in which an exemplary embodiment of the present invention may be implemented.

We have developed a system that can take inquiries specified by different users and compile them to produce processing graphs that can be deployed in a stream processing environment. The current target runtime environment for compiled inquiries is a System S SPC 100, a scalable distributed runtime for stream processing of unstructured data (see FIG. 1).

The SPC 100 provides a set of components for managing stream processing applications under heavy workload. Processing graphs submitted to SPC 100 are described in Job Description Language (JDL), specifying the set of PE instances to be deployed and the data stream connections between them. The runtime environment on each of the SPC nodes includes a Data Fabric for managing data flows and a PE Controller that manages execution of PEs deployed on the node. Structured and/or unstructured data is sent between the PEs, packaged in stream data object (SDO) format. The Graph Manager component controls I/O channels of the data fabric, and a Resource Manager manages dynamic allocation of PE instances to nodes, subject to various resource constraints.

The main focus of the following description is the INQ component, an inquiry compiler, that generates JDL job descriptions based on inquiry goals. Inquiry specifications, encoded in ISL and received through an Inquiry Manager, are fed to a Semantic Planner, which consults various ontologies to interpret the inquiry specification and, if possible, to construct processing graphs that include various data sources and PEs. The processing graphs are then translated into JDL by a Plan Manager, and can be submitted for deployment in the SPC 100. Complete automatic composition may not work in all scenarios; thus, users have the option of reviewing the composed processing graphs and may decide to revise their inquiry and resubmit.

Motivating Application Example

We illustrate the main underlying idea of ISL and inquiry compilation by an example. A fictional company, Enterprise Global Services (EGS), wants to support its service personnel in their efforts to provide responsive customer service. Since company policy allows some types of information to be extracted from the corporation's telecommunications traffic ("your call may be monitored for quality assurance"), and since all of EGS's business telecommunication traverses a VoIP network, EGS managers decide to use information gleaned from the network to improve operations. VoIP-based communications become one of potentially many streaming data sources brought into System S for processing, to determine, for example, the location of on-site remote service personnel, customer satisfaction levels, employee stress, etc. These questions can be answered by various stream processing applications.

Figure 2:
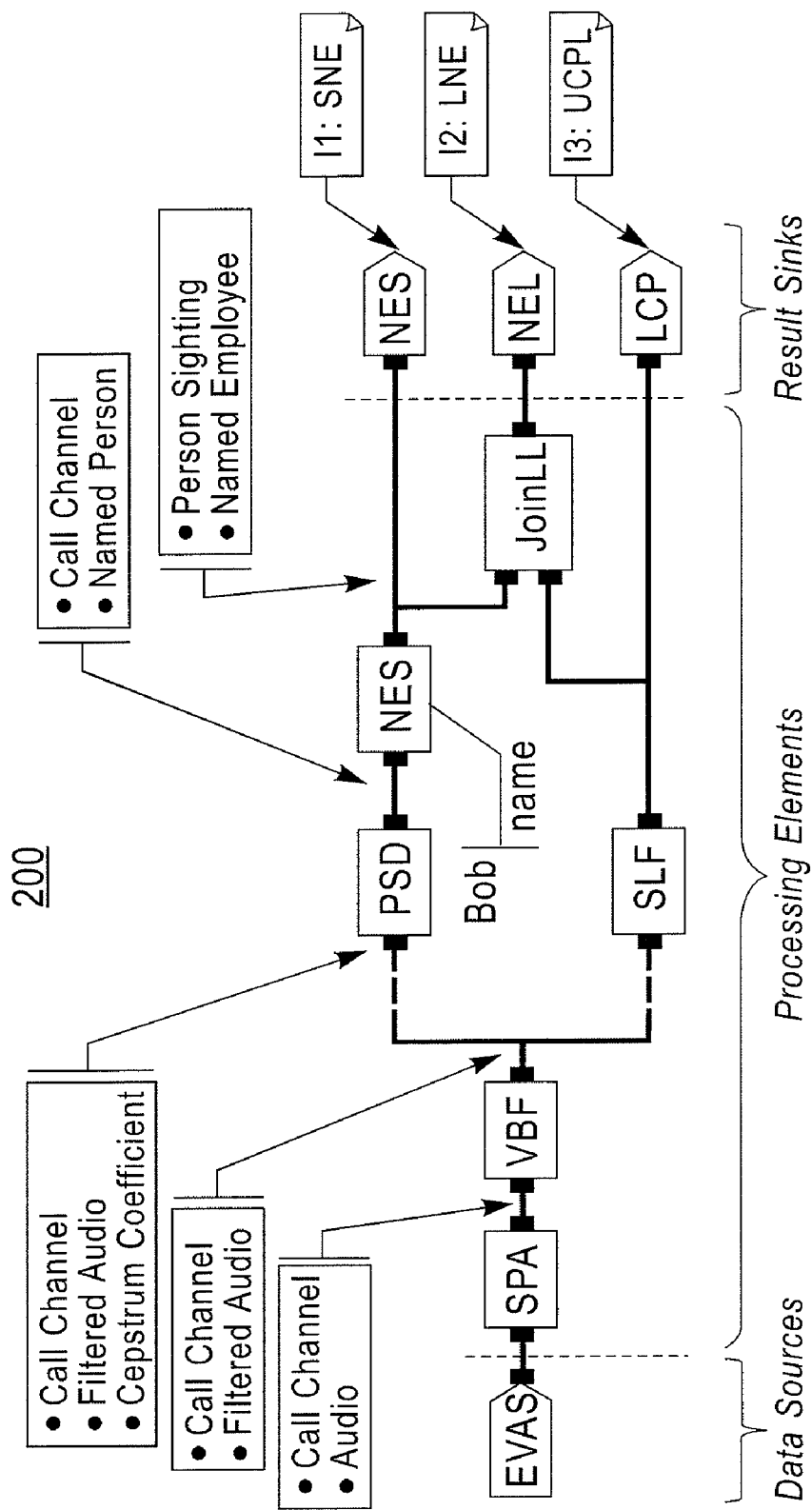
FIG. 2 illustrates a stream processing graph according to an exemplary embodiment of the present invention.

FIG. 2 depicts a processing graph 200 that might have been generated in response to three inquiries, for example, I1: SNE (Sighting of Named Employee), I2; LNE (Location of Named Employee), and I3: UCPL (Unnamed Call Participant Location).

In FIG. 2, the compiler has selected a single Source, EVAS (EGS VoIP Audio Segment) connected to EGS VoIP network. The raw VoIP packets from this source are packaged as SDOs by the SPC 100. A number of PEs have been selected and assembled to process the information. It is to be understood that the processing graph 200 in FIG. 2 does not include all of the PEs required in our implementation. To the far right, three result streams are produced via respective Result Sinks. The NES sink (Named Employee Sighting) produces alerts when employee Bob is sighted (in this case by being a party to a VoIP call), the NEL (Named Employee Locator) sink produces the same alerts, but also provides information on the location of Bob (based on his VoIP terminal's IP address), and the LCP sink (Locate Call Party) streams out information on the location (but not the identity) of any person involved in a call on the EGS network. Different kinds of Result Sinks may store the results in a database, stream them to a user's console, etc.

The graph 200 in FIG. 2 shows the result of overlaying three separate inquiries. Rather than developing three disconnected graphs that would redundantly process data from the EVAS source, the INQ can overlay the graphs and reuse partially processed results.

At a high level, the process of composing this application can be described informally as follows. Given an inquiry for the location of employee Bob, the compiler will try to construct a processing graph that can produce this information. The compiler may consider the JoinLL PE which gives the location of a specific person, and which requires two input streams, one carrying named people associated with a VoIP call channel, and another carrying location information associated with a VoIP call channel. One of its requirements may be satisfied by the NEF (Named Employee Filter) PE, which can provide speakers named "Bob", if it receives a stream of identified speakers, and has a filter configuration parameter, "name", set to "Bob". This search continues until a processing graph (similar to the one shown in FIG. 2) is built, where all input requirements of all PEs are satisfied.

To implement this approach, the Semantic Planner uses formal descriptions of PEs, sources and inquiries, expressed as OWL-based semantic graphs. It makes use of DL reasoning to compare the requirements of PEs and inquiries to streams produced by other PEs and sources. The use of reasoning allows components and streams to be matched to one another even if they use different terms and graph structures.

If more than one alternative processing graph can satisfy an inquiry, the planner evaluates all possible alternatives, rejecting those that violate various operational constraints and selecting optimal graphs from the remaining alternatives. These operational constraints include security and privacy, which are key concerns in a number of domains. The compiler checks to ensure that the processing graphs that do not reveal sensitive data to those not authorized to view it.

Advantages of a Semantic Model

Several alternative data models can be used to describe stream queries and stream system components. These include keyword-based models, relational models, object oriented models, etc. The main rationale for choosing a semantic model are the expressivity and extensibility afforded, and the reasoning mechanisms available to support composition.

Semantic models are especially useful for declaratively describing the outcomes of processing on data in a formal manner, allowing a planner or compiler to select operations believed to achieve those outcomes. Relational algebras (and their extensions) are well suited for describing different kinds of operations on structured streaming data. However, they are not convenient to use for describing different kinds of processing of unstructured data in different formats (including text, audio, video, etc.). Although, SQL supports user defined functions and stored procedures that can perform arbitrary analysis of data, these functions have to be appropriately applied by users crafting SQL queries. The people writing SQL queries need expert knowledge not just of the input and output requirements but also of the capabilities and composition constraints of the extended functions. This approach does not scale well when the sets of possible operations and kinds of data are large and dynamically changing.

The Semantic Planner relies on descriptions of PEs and data sources in OWL ontologies. While the process of developing ontologies introduces additional complexity and increases the costs of developing applications, we believe that in large systems, the advantages achieved in separating PE and source development from the formulation of inquiries outweighs such concerns. This provides a rough equivalent of making database queries independent of the database schema and stored procedures, via a mapping supported by extensible ontologies.

Descriptions of Streams

A stream carries zero or more data objects, called SDOs. Each SDO is associated with a timestamp. A stream is also associated with metadata, which is described semantically, using a graph represented in OWL. The metadata provides rich information about the meaning of the data on the stream, together with its format.

Ontologies

Ontologies form the basis of semantic descriptions of streams. Ontologies provide a formal description of the kinds of salient entities and how they are related. OWL ontologies describe concepts (or classes), properties and individuals (or instances) relevant to a domain of interest. OWL is based on DL, which is an expressive and decidable subset of first order logic. In DLs, there are two kinds of facts: "TBox" (terminological) and "ABox" (assertional). In general, the TBox contains sentences describing concepts and properties. For instance, it describes concept hierarchies and the domains and ranges of properties. ABox axioms describe "ground" sentences about individuals (or instances). The ABox describes the concepts to which an individual belongs and its relationship to other individuals.

We currently adopt the simplifying assumption that there is a common set of ontologies upon which all stream descriptions, PE and data source descriptions and inquiry goals are built. This allows us to create semantic descriptions without having to address the tough problem of integrating overlapping ontologies (e.g., reconciling a user's view versus a PE developer's view of EmployeeSighting).

Figure 3:
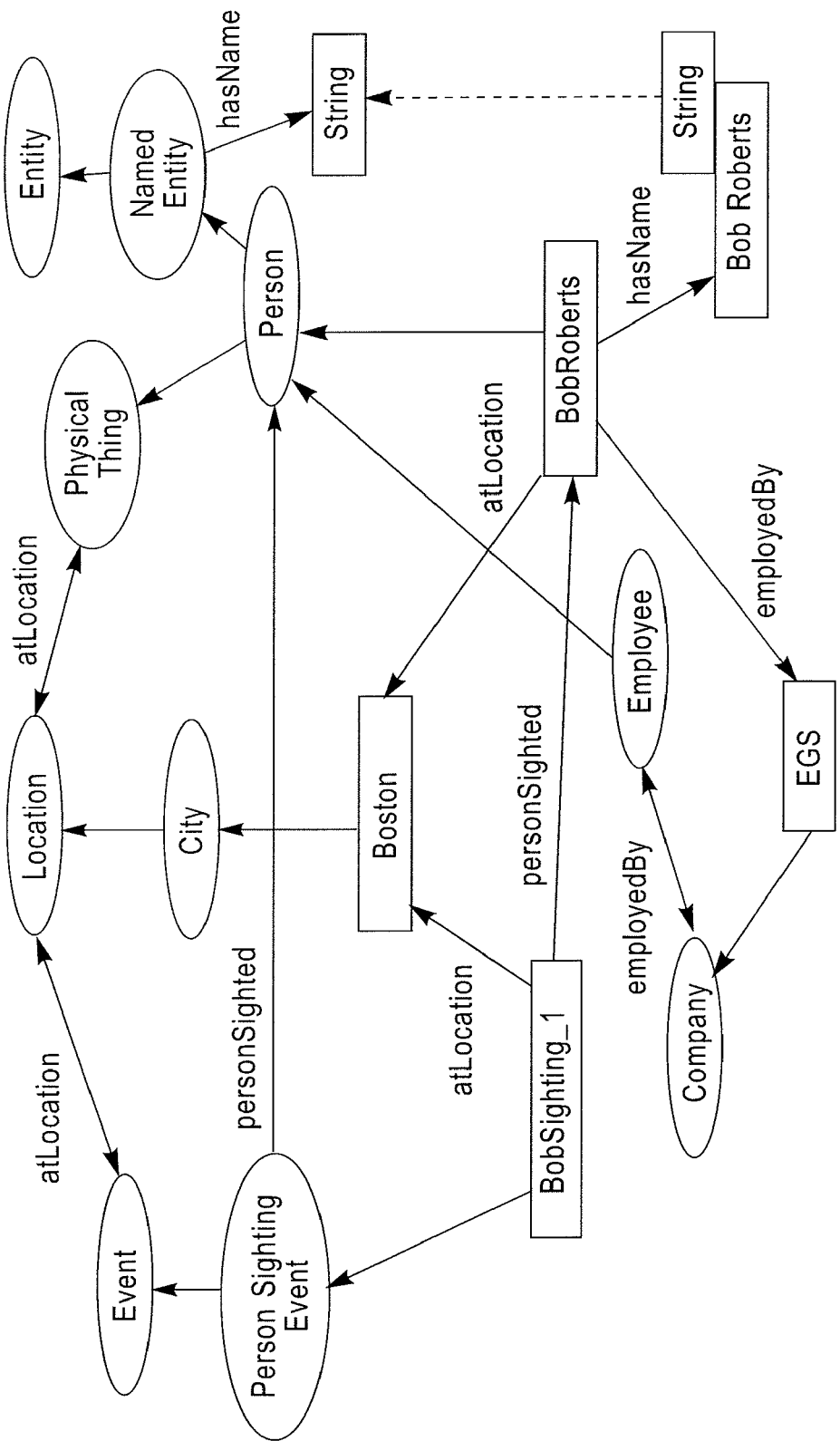
FIG. 3 illustrates TBox axioms and ABox assertions from several ontologies from which processing requests and component models according to an exemplary embodiment of the present invention may be created.

For the EGS example, we draw on several ontologies that describe domain independent concepts such as Physical Thing, Person and Event, as well as domain-specific concepts like PersonSighting, and Employee. Concepts may be related via subClassOf relationships. A property has a domain and a range. For instance, the domain of employedBy is Employee and the range is Company. OWL Object Properties (like employedBy) have a range which is a concept, and OWL Datatype properties (like hasName) have a range which is an xsd datatype. Individuals (like EGS and BobRoberts) belong to one or more concepts and related to one another, or to literal values (like the string "Bob Roberts"), through various properties. FIG. 3 shows a portion 300 of the ontologies.

Preliminary Definitions from RDF and OWL

RDF Term. Let U be the set of all URIs. Let $RDF_L$ be the set of all RDF Literals (which are data values, that may be typed). The set of RDF Terms, $RDF_T$, is $U \cup RDF_L$. Note that RDF also defines blank nodes, which are not included in the model.

RDF Triple. An RDF triple contains three components: a subject, a predicate and an object. The subject and predicate is represented as a URI, while the object is an RDF Term. An example of a triple is (Earth locatedIn SolarSystem).

RDF Graph. An RDF graph is a set of RDF triples. The set of nodes of an RDF graph is the set of subjects and objects of triples in the graph. The edges are labeled by the properties.

OWL Axiom. An OWL Axiom is a sentence in the TBox of an ontology that gives information about classes and properties. This information includes subclass and subproperty relationships, whether a certain property is transitive, symmetric or functional, or the inverse of another property, restrictions on the values of a property, etc. OWL Axioms may be represented as RDF triples. An example is (Planet rdfs:subClassOf HeavenlyBody).

OWL Fact. An OWL fact is an ABox assertion that states information about a particular individual, in the form of classes that the individual belongs to plus properties and values of that individual. OWL facts may also be represented as RDF triples. An example is (Earth a Planet).

Semantic Description of a Stream

Each stream is associated with a semantic description, represented as a special kind of semantic graph that captures the semantics of the data in a typical (or exemplar) SDO in the stream. The semantic description describes the data present in the typical SDO and any constraints that are satisfied by the data in terms of a graph of OWL facts.

Exemplar Individual. In order to describe the semantics of a stream, we introduce the notion of an exemplar individual, which is a special kind of OWL individual. An exemplar individual is a member of the set $E_I$ where $E_I$ is infinite and $E_I \subset U$. An exemplar individual represents an existentially quantified variable. In a particular SDO, it may be associated with a value that belongs to the set of regular (or non-exemplar) individuals, i.e., the value belongs to $U-E_I$. For the purpose of representation in an OWL ontology, we describe the exemplar individual as an OWL individual that belongs to a special concept called Exemplar.

Exemplar Literal. An exemplar literal is a member of the set $E_L$ where $E_L$ is infinite and $E_L \subset RDF_L$. An exemplar literal also represents an existentially quantified variable. In a particular SDO, it may be associated with a value that belongs to the set of regular (or non-exemplar) literals, i.e., the value belongs to $RDF_L - E_L$. For the purpose of representation in an OWL ontology, we define an exemplar literal to have a special xsd type called xsd:exemplar. In the following all exemplar individuals and literals are represented with a preceding _.

The semantic description of a stream is expressed in terms of exemplar individuals and exemplar literals. Exemplar individuals may be associated with a number of constraints in the semantic description of the stream. For example, the constraints on exemplar individuals include the classes they belong to and values of various properties. Different SDOs in the stream may replace the exemplar individuals and literals with regular (or non-exemplar) individuals and literals. The replacement regular individuals and literals must obey all the constraints that are associated with the exemplars.

Stream-Triple. A stream-triple is an OWL fact where either the subject is an exemplar individual or the object is an exemplar individual or an exemplar literal. An example of a stream-triple is (_x a Person). Note that the property indicates that the subject, _x, is an individual that is of type (Person), which is an OWL concept. Different SDOs in a stream may replace _x with different values (such as John or Mary). However, any values that _x is replaced by must satisfy the condition that its type is Person.

Stream-Graph. A Stream-Graph is a set of Stream-Triples. An example, depicted below in RDF N3 format (described in T. Berners-Lee, Notation 3. Technical report, a copy of which is incorporated by reference herein in its entirety) is:

```
:___CallingCity__1        a              :City;
                          :hasFormat     "com.egs.city^
                                          xs:ncname".
:___EmployeeVoIP__Call__1 a              EmployeeVoIP__Call ;
                          :atTime        :___CallStartTime^
                                          xs:dateTime ;
                          :atLocation    :___CallingCity__1 ;
                          :ofPerson      :___Employee__1 .
:___Employee__1           a              :Employee ;
                          :hasName       :___EmployeeName__1^
                                          xs:string ;
}
```

Semantic Description of a Stream

The semantic description of a stream describes the data present in a typical SDO (on the stream) and any constraints on the data, expressed using a graph of OWL facts. The semantic description of a stream is a 3-tuple of the form (SN, SD, SG) where SN is the name of the stream. The stream name is represented as a URI, i.e., SN∈U SD is the set of data items contained in the typical SDO in the stream. The data in the typical SDO is represented as exemplar individuals and exemplar literals. That is, $SD \in 2^{E_I \cup E_L}$ SG is the stream graph that describes the semantics of the data on the typical SDO in the stream. The stream graph describes the constraints associated with all the exemplar individuals and exemplar literals that are contained in the stream.

For each data time, d in the typical SDO, (d∈SD), there must exist a stream-triple in SG that associates d with a format. The actual value of the format depends on the application and the stream-system under consideration. The format may be described in different ways such as a type in a programming language like C or Java, an element in an XML schema, an encoding format (such as text, jpg or mpeg), etc.

Figure 4:
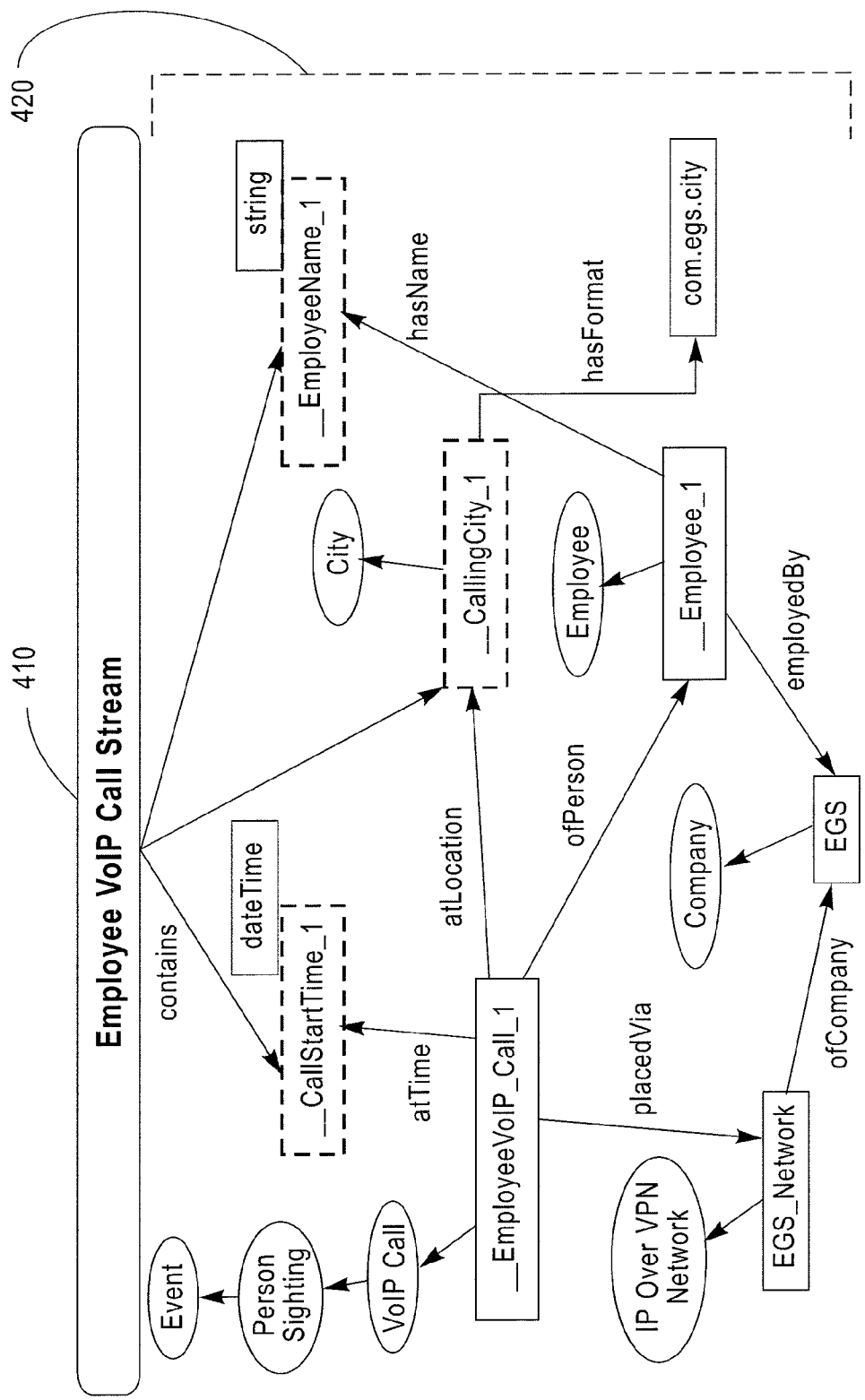
FIG. 4 illustrates a stream described using a semantic graph according to an exemplary embodiment of the present invention.

An example of a stream 410 is the Employee_VoIP_Call-Stream (see FIG. 4) which contains the exemplars _CallStartTime_1, _CallingCity_1, and _EmployeeName_1, partly described by the stream's graph 420, SG. Each SDO in the stream 410 contains elements that satisfy all the constraints described on the exemplars _CallStartTime_1, _CallingCity_1, and _EmployeeName_1. The format of the elements in the SDO are also specified in the stream-graph 420. In this case, the format is represented as a Java classname. The faded portions of the graph in the diagram represent facts that are not part of the stream description itself, but are part of the domain ontology.

Also, note that a stream description only contains OWL facts, i.e., assertions about different individuals (exemplar and regular) and how they are related. It does not contain OWL TBox axioms, i.e., it does not define new concepts or properties, or extend the definitions of existing concepts and properties. A stream description only uses concepts and properties defined in the ontologies, such as the stream 410 in FIG. 2.

An important point is that the contains relation explicitly defines the data contained in the stream (or typical SDO). The example stream only contains _CallingPartyLocation_1, _EmployeeName_1 and _CallStartTime_1. Other nodes in the description like _Employee_1 and EGS do not really appear in the stream 410. They form part of a rich semantic description of the data contained in the stream 410.

Ground Instance of a Stream-Graph

Exemplar individuals and literals in a stream-graph act as existentially quantified variables. In a specific SDO, they are replaced by regular, non-exemplar individuals or literals.

Let M be a mapping from a set of exemplar individuals and literals to some set of non-exemplar individuals and literals. Then the graph obtained from a stream-graph, G by replacing all of the exemplar individuals and literals, e, in G by M(e) is a ground instance of G. This ground instance is represented by M(G).

Figure 5:
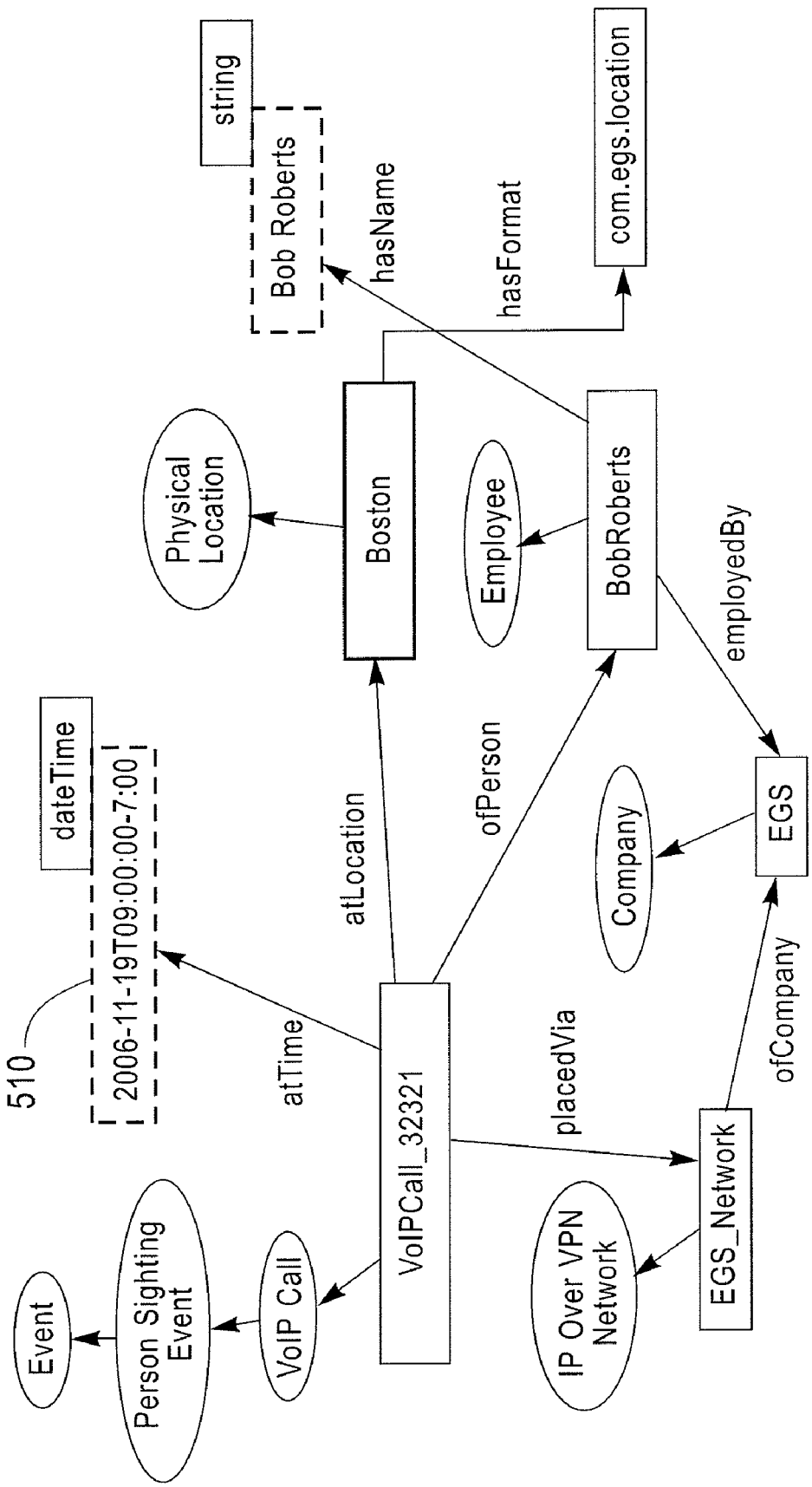
FIG. 5 illustrates a stream data object (SDO) according to an exemplary embodiment of the present invention.

Semantics of an SDO in the Stream. Each specific SDO in a stream is also described as a semantic graph that is derived from the semantic description of the stream, after replacing all exemplar individuals and literals by regular (non-exemplar) individuals and literals. The semantic description of an SDO can described by a ground stream-graph. For example, a specific SDO may contain a specific city, say Boston, with the employee's name replaced by Bob Roberts, etc. FIG. 5 describes the example SDO 510.

Inquiries

Users interact with the stream processing system by issuing inquiries. Inquiries allow users to specify the kinds of streams that are of interest to them in a semantic manner. Users can specify the data that the streams must contain as well as graph-patterns that provides further semantic information about this data. In order to specify this information, the notion of a stream-pattern is introduced, which will be formally defined later.

The result of an inquiry is a set of streams. The user can specify what actions must be performed on the SDOs on the result streams. This is referred to as a result disposition. Example result dispositions are sending a notification to the user, storing the SDO in a database, etc. In addition, an inquiry can specify additional constraints on the processing graphs that are eventually produced by the planner. These constraints are optional and include the maximum amount of computational resources that may consumed by the PEs in the processing graph and sets of PEs and data sources to avoid or to prefer while building the graph.

The Inquiry Specification Language

Inquiries are represented in a language called Inquiry Specification Language, or ISL. The general syntax of ISL is shown below:

```
Inquiry <InquiryName>
    Produces
        Result <ResultName_1>
            WithElements <VariableSet_1>
            WithDispositions <DispositionSet_1>
            Where <Graph Pattern_1>
        ...
        Result <ResultName_n>
            WithElements <VariableSet_n>
            WithDispositions <DispositionSet_n>
            Where <Graph Pattern_n>
        WithConstraint
            <MaxResourceUtilization Constraint>
            <PE or Data Source Avoidance Constraint>
            <PE or Data Source Preference Constraint>
```

An example on an inquiry in ISL is:

```
Inquiry EmployeeSightingInquiry
    Produces
        Result EmployeeSighting
            WithElements ?SightingLocation,
                ?SightingTime_1, ?EmployeeName
            WithDispositions Notify abc@egs.com
            Where
                ?SightingLocation a :Location;
                ?EmployeeSighting :atLocation ?SightingLocation;
                ?EmployeeSighting :atTime ?SightingTime_1;
                ?EmployeeSighting a PersonSightingEvent;
                ?EmployeeSighted :fromEvent ?EmployeeSighting;
                ?EmployeeSighted a :Person;
                ?EmployeeSighted :employedBy :Person;
                ?EmployeeSighted :hasName :EmployeeName;
```

Figure 6:
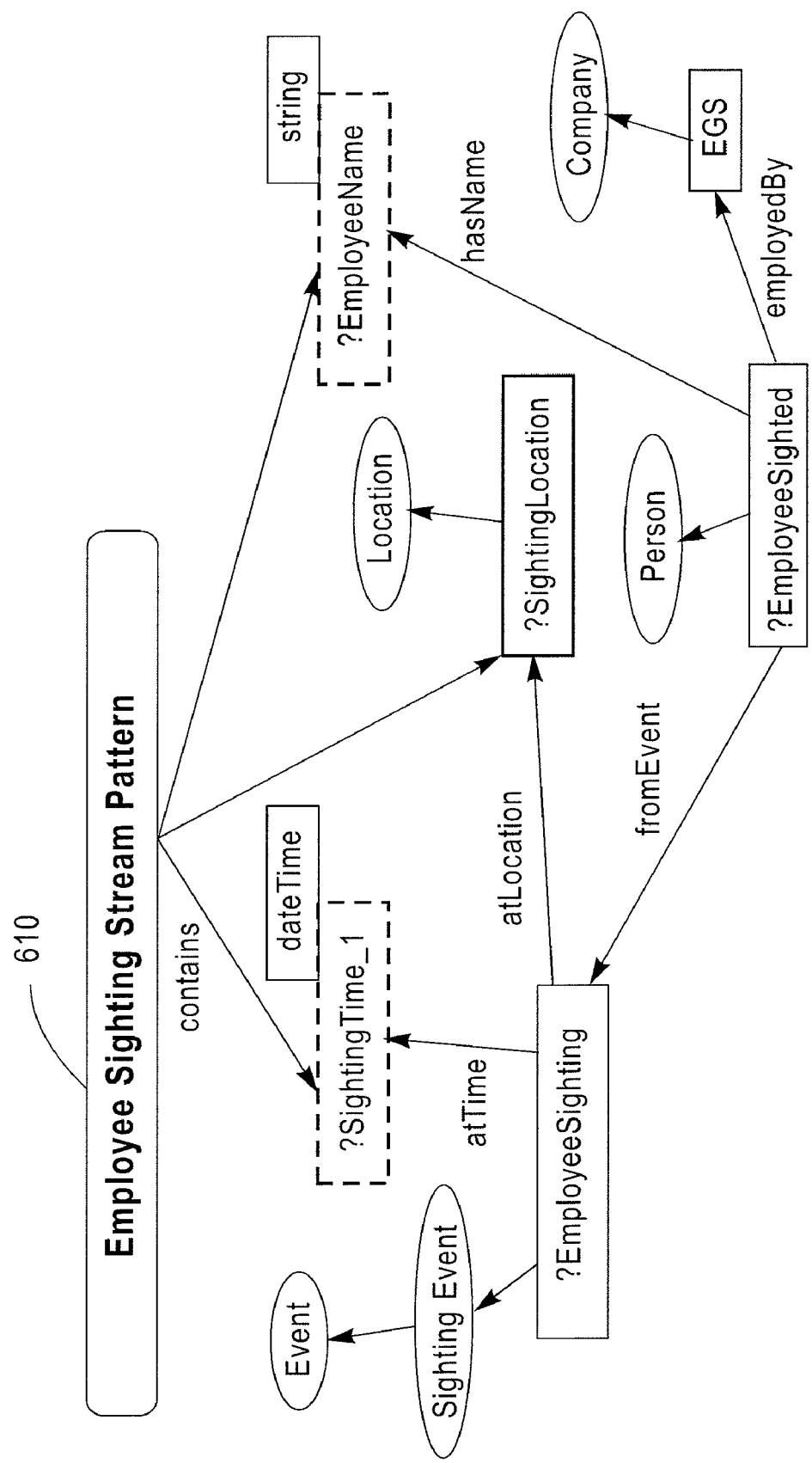
FIG. 6 illustrates a stream pattern described according to an exemplary embodiment of the present invention.

The core element in an inquiry is the stream-pattern (as example of which is shown by numeral 610 in FIG. 6). Broadly, a stream-pattern describes an equivalence class of streams. It describes the data that must be contained on the stream as a set of variables and a graph-pattern that attaches additional semantics to these data on the stream. The description of a stream-pattern looks similar to the description of a stream, except that certain elements in the description can now be variables.

A variable is a member of the set V where V is infinite and disjoint from $RDF_T$.

A triple pattern is an RDF triple, containing a subject, predicate and object, where either the subject or the object is a variable. An example of a triple pattern is (?x employedBy EGS).

A graph pattern is a set of Triple Patterns. An example graph pattern appears in the Where clause of the inquiry above.

A stream pattern is a 2-tuple of the form SP(ID, IGP) such that

ID is a set of variables representing the data that must be contained on any matched stream. $ID \in 2^V$ IGP is a graph pattern that describes the semantics of the data on the stream.

Inquiries are described using stream-patterns, that specify the kinds of streams the user is interested in. The result of an inquiry is a set of streams that, match the stream patterns. Formally, an inquiry is a 3-tuple of the form (IN, <SP, RD>, CC) where IN is a string that represents name of the inquiry <SP, RD> represents a set of stream patterns, where each stream pattern, SP, is associated with a set of result dispositions, RD.

CC is a set of compositional constraints.

Conditions for Inquiry Satisfaction

An inquiry is satisfied by a set of streams that match the stream-patterns described in the inquiry. We will first describe what is required for a stream to match a stream-pattern, and then extend this definition to describe what is required for a set of streams to match the set of stream-patterns in an inquiry.

Matching a Stream to a Stream-Pattern. A stream matches a stream-pattern if and only if all the conditions (or constraints) in the stream-pattern are satisfied by the stream. In order to define a match, we first define the notion of a pattern solution, which expresses a substitution of the variables in a stream pattern. We then define the conditions for a match in terms of the existence of an appropriate pattern solution.

Pattern Solution. A pattern solution is a substitution function ($\theta: V \to RDF_T$) from the set of variables in a graph pattern to the set of RDF terms. Variables may also be mapped to exemplar individuals and exemplar literals. For example, some of the mappings defined in a possible definition of θ for the graph pattern, in the example inquiry is: θ (?EmployeeName)=_EmployeeName_1, θ (?SightingTime_1)=_CallStartTime_1, etc.

The result of replacing a variable, v is represented by θ (v). The result of replacing all the variables in a graph pattern, GP, is written as θ (GP).

Condition for match. Consider a stream-pattern SP(SV, GP), and a stream, S(SN, SD, SG). We define the stream-pattern, SP to be matched by the stream, S, based on an ontology, O, if and only if there exists a pattern solution, θ, defined on all the variables in GP, such that following conditions hold:

θ (SV) ⊆ SD, i.e., the stream contains at least those elements that the pattern says it must contain.

SG∪O|=θ(GP) θ (GP) where O is the common ontology, and I=E is an entailment relation defined between RDF graphs. For instance, E may be RDF, RDFS, OWLLite, OWL-DL, etc. In other words, we try to see if it is possible to infer the substituted graph pattern from the stream-graph according to some well defined logical reasoning framework.

Figure 7:
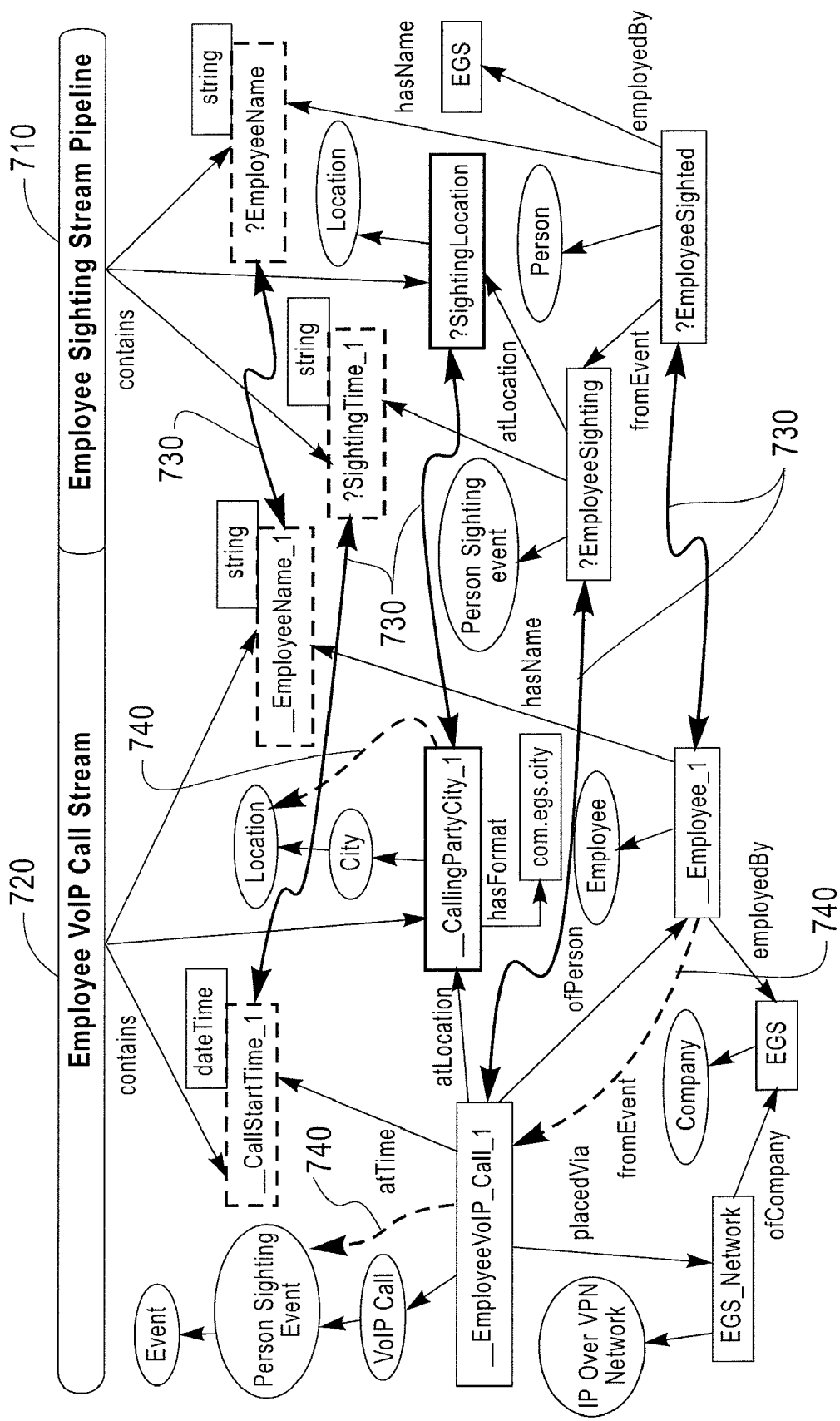
FIG. 7 illustrates matching an inquiry to a described result stream according to an exemplary embodiment of the present invention.

We represent this match as S▷ SP to state that stream S matches stream pattern, SP with a pattern solution, θ. One way of looking at the above definition is that the stream should be more general than the stream-pattern. The stream should have at least as much semantic information as described in the inquiry. FIG. 7 shows how the EmployeeSightingStreamPattern 710 might match the EmployeeVoIP-CallStream 720. The arrows 730 show the variable substitutions. In order to make the match, some DL reasoning based on subclass and inverse property relationships must be done. The arrows 740 denote the inferred relationships. For example, the fromEvent relationship on the EmployeeVoIP-Call-Stream is inferred, since it is fromEvent is declared to be an inverse property of Person. Once the inferences are done, it is clear to see that the graph on the right is a subgraph of the graph on the left; hence a match is obtained.

Matching Streams to Stream Patterns. The different stream-patterns in an inquiry may not be independent. They may share variables, and thus, the assignment of variables to values for one stream pattern would also depend on any constraints associated with the variable in other stream patterns. Hence, it is not possible to look at each stream-pattern individually and determine if a certain stream matches the stream-patter. All the stream-patterns must be treated holistically.

Let SP ($SP_1$ $SP_2$, ..., $SP_n$) represent the set of n stream-patterns in an inquiry. Each stream pattern is of the form $SP_i(ID_i, IGP_i)$.

Let S ($S_1, \ldots S_m$) represent a set of n streams. Each stream is of the form $S_i(SN_i, SD_i, SG_i)$. We define the set of stream-patterns, SP, to be matched by the set of streams, S, if and only if there exists a pattern solution, θ, defined on all the variables in $$\bigcup_{i=1}^{n} IPG_i,$$

such that $S_i \triangleright_{SP_i}$ for i=1, ... n.

Compilation of ISL

Figure 8:
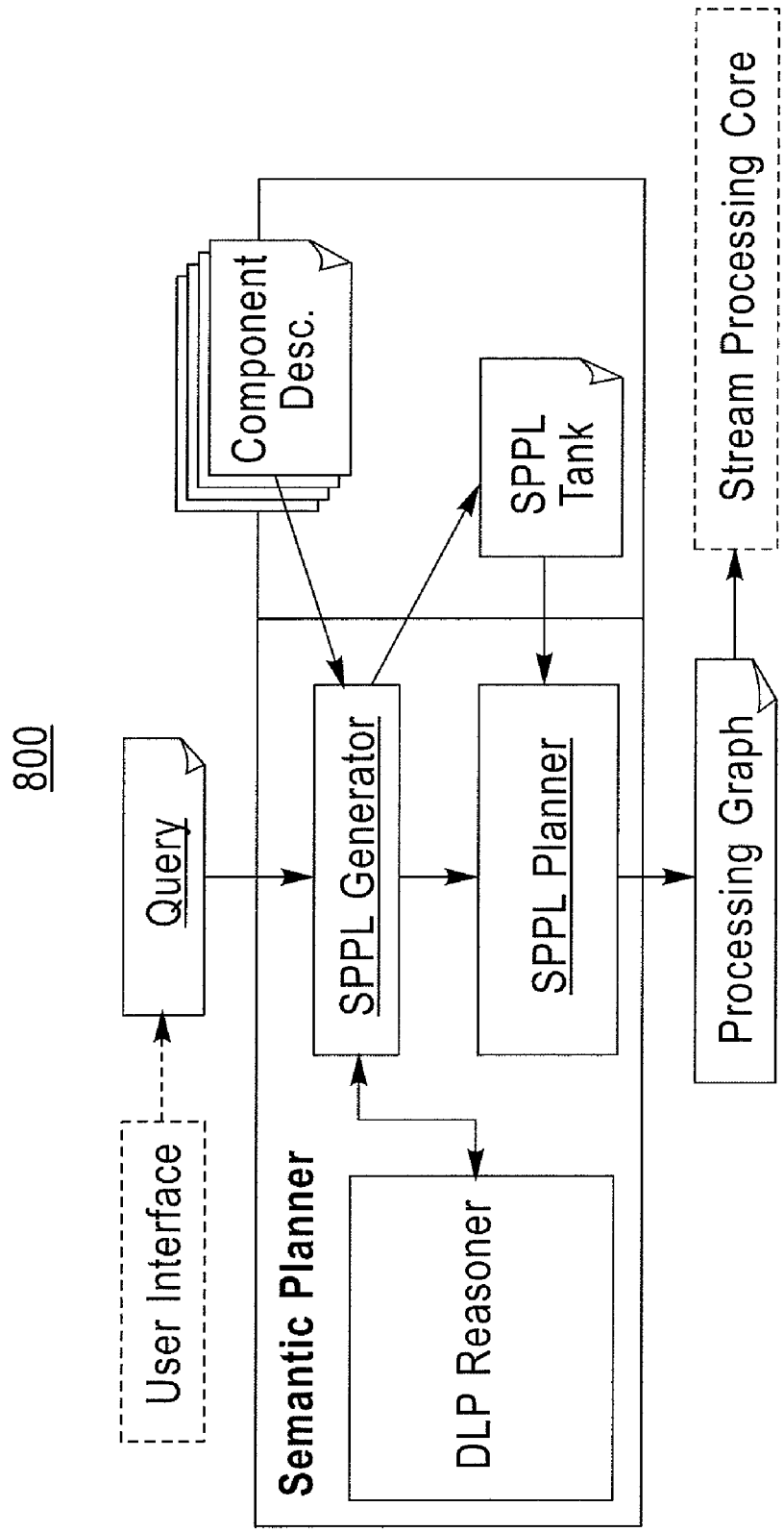
FIG. 8 illustrates compiler according to an exemplary embodiment of the present invention.

We now discuss how ISL can be compiled so that an application is assembled for an inquiry. FIG. 8 illustrates the architecture of the compiler 800. In the following, we shall first provide an overview of the compiler 800. We then describe in more detail the formal model of data sources and PEs. This will allow the compiler 800 to decide how to compose a processing graph, consisting of these data sources and PEs, such that a set of streams are produced which match the inquiry goals. We then discuss the two main steps in the compiler 800, which are the transformation of semantic information and the semantic planning.

Overview of the Compiler

Figure 9:
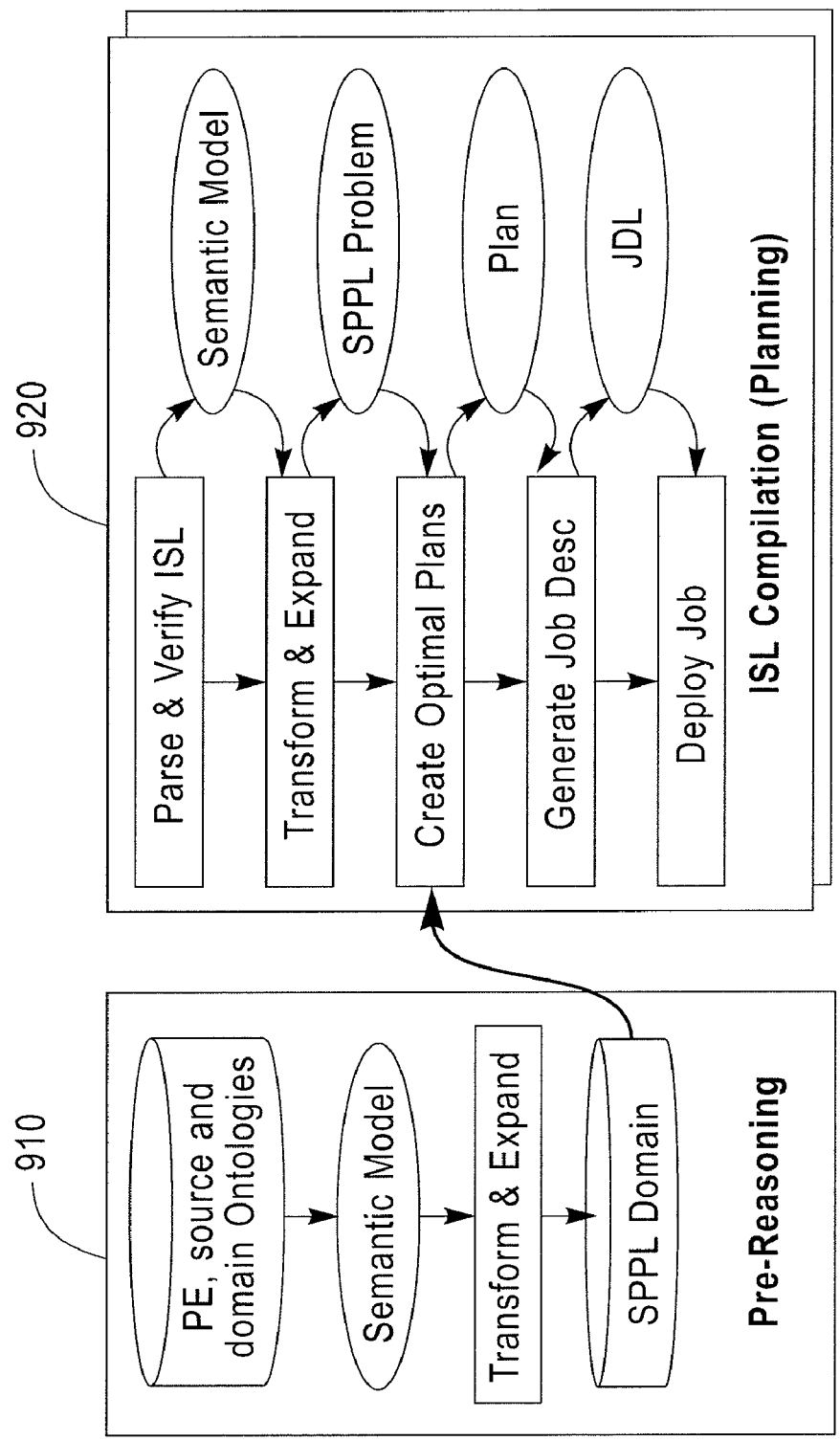
FIG. 9 illustrates pre-reasoning and inquiry specification language (ISL) compilation according to an exemplary embodiment of the present invention.

FIG. 9 illustrates the two phases of inquiry planning: pre-reasoning 910, that takes place off-line, before any inquiries are received, and compilation 920 of individual inquiries in ISL. In the off-line pre-reasoning phase, a part of Stream Processing Planning Language (SPPL) planning task, (as described in A. Riabov and Z. Liu Planning for stream procession systems. In AAAI'05, July 2005, a copy of which is incorporated by reference herein in its entirety) called SPPL domain is created, after translating and performing DL-reasoning on the PE and source descriptions specified in the ontologies. The domain is then persisted and re-used for multiple inquiries. During compilation phase, the inquiry is parsed, and OWL ontologies are used again to verify the validity of the inquiry. Before planning, the inquiry is translated into a definition of the SPPL, problem. The planner produces a plan consisting of actions that correspond to PEs and sources. Finally, the plan is registered with the plan manager, and into JDL, which can then be deployed in SPC.

In addition to semantic matching of streams to PE inputs, the compositional constraints taken into account by the planner include resource and security constraints. A specific set of security constraints have been proposed for use in processing graph planning (as described in M. Lelarge, Z. Liu and A. Riabov. Automatic composition of secure workflows. In ATC-06, 2006, a copy of which is incorporated by reference herein in its entirety), and we are supporting similar lattice-based access control constraints in the compiler. Provided the number of data sources and PEs is sufficiently large, there may exist multiple alternative processing graphs for the same inquiry. The planner uses a number of metrics to compare processing graphs, and returns only the processing graphs that are Pareto optimal, i.e., cannot be improved on any quality dimension without sacrificing in another. The metrics in use include resource utilization, security and privacy risks, and application-specific quality measures. The latter are computed using symbolic computation, under an assumption that PEs are capable of producing streams at fixed quality levels. Examples of such application-specific measures can be output video quality, image resolution, confidence in a forecast, etc. Resource metric is additive across the PEs and sources, and the risk metric is computed according to a soft-constraint-based security model.

Model of PEs and Data Sources

A data source is described as producing a single stream. Formally, a data source is a 3-tuple of the form (DSN, SDS, DD) where DSN is a URI that represents the name of the Data Source SDS is the semantic description of a stream.

DD is an RDF graph consisting only of OWL facts that describe other properties of the data Source not related to the stream it produces. Examples of such properties are location and owner of the source.

Figure 10:
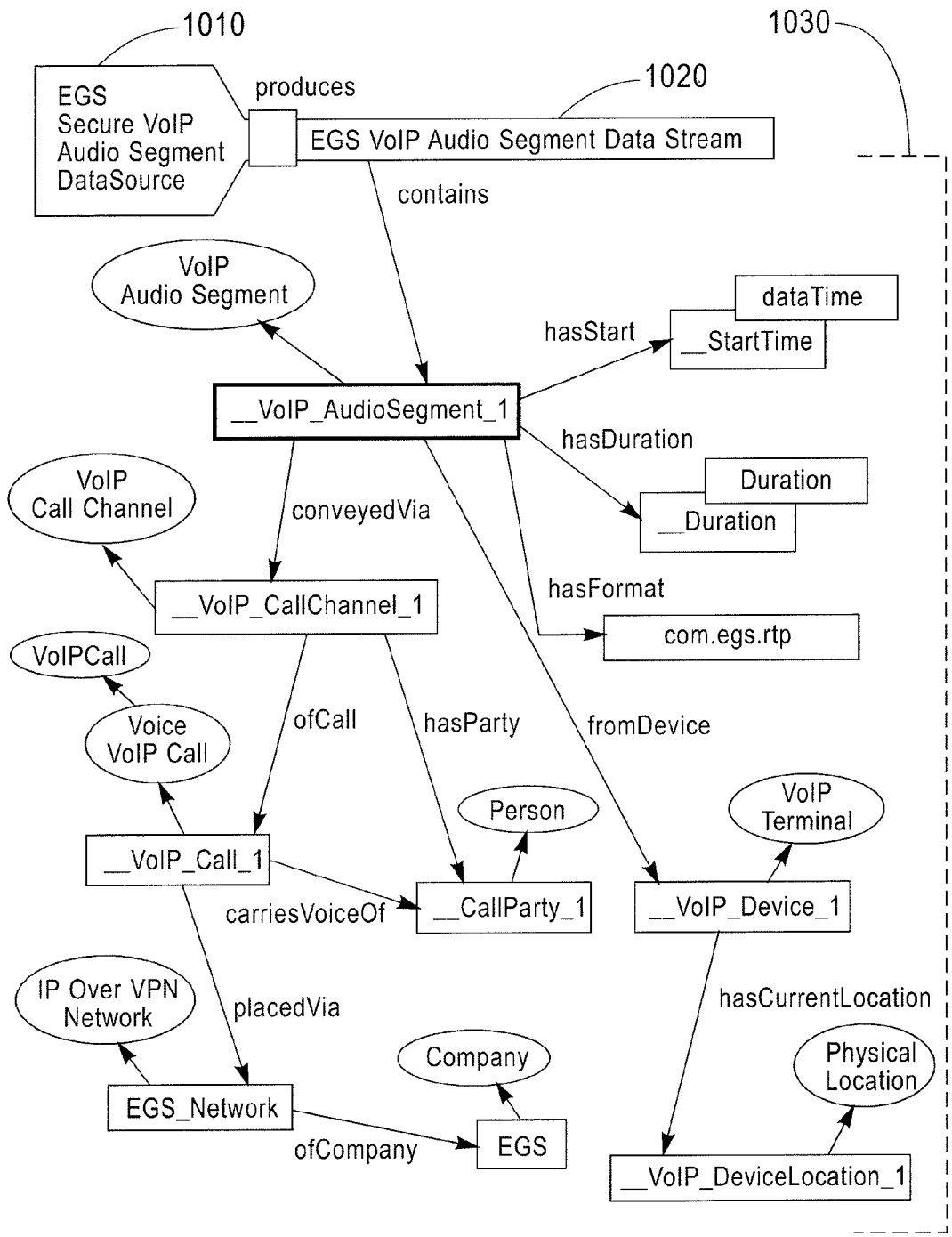
FIG. 10 illustrates a data source semantic description according to an exemplary embodiment of the present invention.

An example Data Source 1010 is shown in FIG. 10. This source produces a stream 1020 that contains an exemplar called: _VoIP_AudioSegment_1. Its semantic graph 1030 describes the constraints on: _VoIP_AudioSegment_1. For instance, the graph 1030 states that: _VoIP_AudioSegment_1 is of type: VoIP_AudioSegment.

PEs are described in terms of the kinds of streams they requires as input and the kinds of streams they produce as output. They are modeled in terms of graph transformations. The inputs and outputs are described as stream-patterns, which in turn consist of graph patterns. Hence, the basic PE model is that it takes m input graph patterns on its m input streams, processes (or transforms) them in some fashion and produces n output graph patterns on its n output streams. In addition, a PE can have zero or more configuration parameters that can be used to dictate how exactly the PE behaves. Each configuration parameter is represented as a variable literal of a certain type (like xs:string orxs:int).

A PE is a 5-tuple of the form (PN, Params, ISR, OSD, PD) where

PN is a URI that represents name of the PE

Params is a set of configuration parameters that are described as variable literals.

ISR is a set of input stream requirements, where each input stream requirement is represented as a streampattern. The different stream-patterns may overlap; i.e., the graph patterns they contain may share common nodes and edges. The overlap helps in describing dependencies between the different input stream patterns.

OSD is a set of output stream descriptions, where each output stream description is represented as a streampattern. They may contain exemplars, especially to signify new kinds of data being created. Again, the different stream-patterns may overlap amongst themselves as well as with the input stream patterns.

The set of variables in OSD is a subset of the set of variables that are described in ISR and Param. This helps ensure that no free variables exist in the output stream description, an essential requirement for the planning process.

PD is an RDF graph consisting only of OWL facts that describe other properties of the PE not related to its input requirements and output production. These properties can include the PE developer, the version number, etc.

Figure 11:
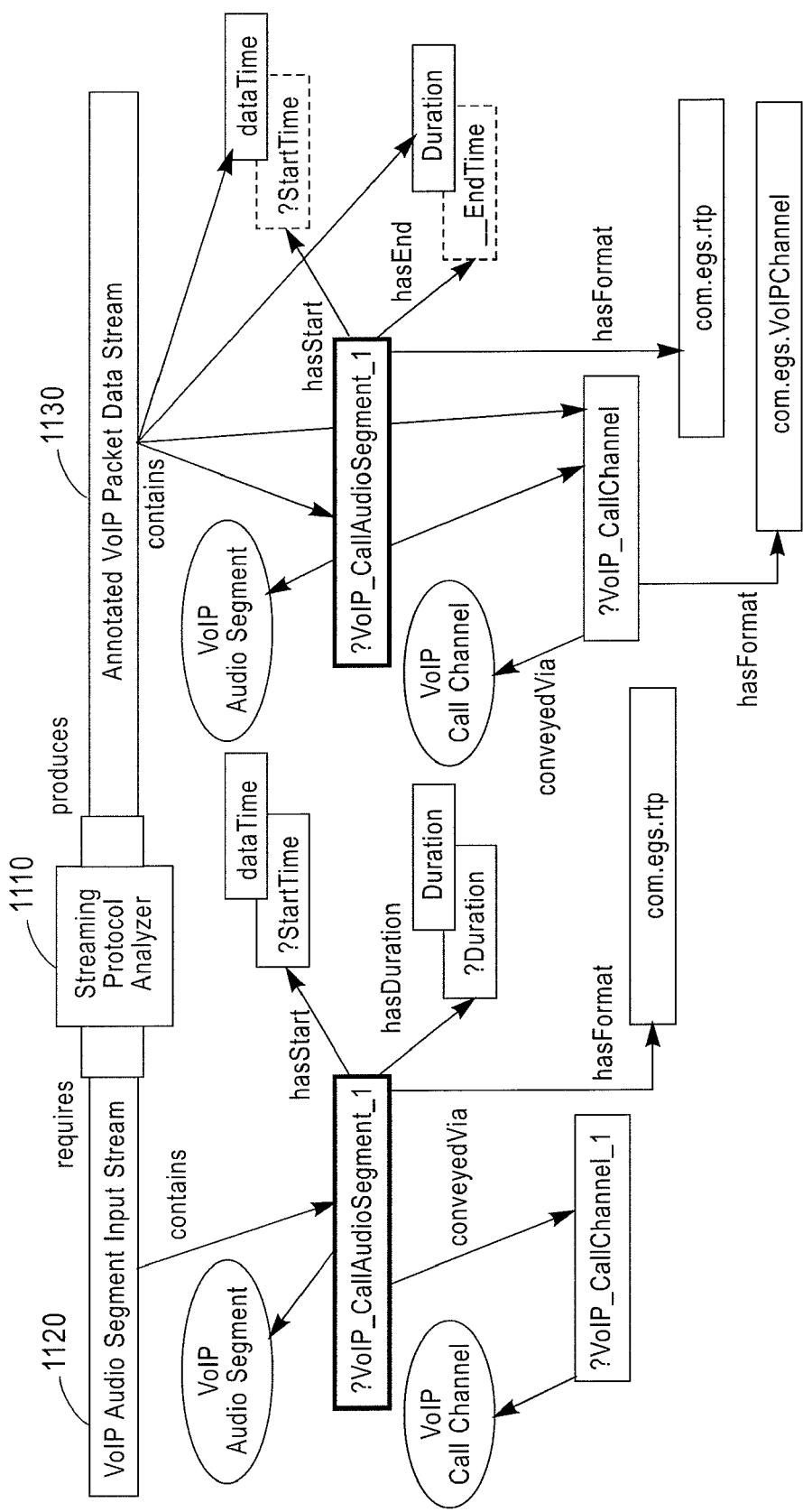
FIG. 11 illustrates processing element (PE) semantic description according to an exemplary embodiment of the present invention.

An example PE 1110 is shown in FIG. 11. The PE 1110 requires an input stream 1120 that contains ?VoIP_CallAudioSegment_1 that is associated with various constraints. The format of ?VoIP_CallAudioSegment_1 is an RTP packet. The PE 1110 extracts the start time and call channel information from the incoming RTP packet and computes the end time from the duration. It then puts this information along with the original ?VoIP_CallAudioSegment_1 on its output stream 1130.

The semantic description of a PE gives a general, application independent, description of the kinds of streams and parameters it requires and the kinds of streams it produces. In a given application (or processing graph), a specific set of input streams may be connected to the PE and a specific set of configuration parameters may be given to the PE. As a result, the PE produces a specific set of output streams.

Previously, the conditions for matching a set of streams to a set of stream patterns were described. The compiler checks these conditions when it tries to connect a specific set of input streams to the PE. In addition, it also ensures that the configuration parameters are valid, i.e., they satisfy any constraints associated with them.

Pre-Reasoning and SPPL Generation

In this subsection we include a brief overview of the SPPL formalism, describe how pre-reasoning is accomplished, and describe how SPPL is generated after pre-reasoning is done.

Overview of SPPL Model. SPPL is a planning task formalism developed for efficient planning in stream processing application domains. SPPL planning task is comprised of a domain definition domain=<types, predicate*, const, facts, action*>, and a problem definition problem=<object*, init*, goal*>. domain in our system is static and describes the PEs and the sources; problem is generated dynamically from the received inquiry. In contrast with traditional planning formalisms, the state of the world in SPPL is modeled as a set of streams. The predicates are interpreted only in the context of a stream.

SPPL problem defines a set of streams in the initial state init* by listing the predicates that are true on each of the initstreams, and a set of goals goal*, by listing predicates that must be true in the goal state. A valid plan is a sequence of action instances, such that when the action instances are applied to state init* in the order specified in the plan, all action instances are legal when applied, and in the final state for each goal there exists a stream where all predicates of the goal are true.

Pre-reasoning. The use of reasoning helps make the matching process more powerful. Reasoning allows us to match streams to stream patterns even if they are described using different terms and different graph structures. In order to improve efficiency of planning, INQ performs pre-reasoning on descriptions of sources and PEs to generate expanded descriptions that include the results of reasoning. The expanded descriptions are then stored and later used by the semantic planner when compiling individual inquiries.

We do DLP reasoning both on the stream-graphs of the streams produced by data source and on the output graph patterns of the streams produced by PEs. OWL-DLP is an expressive sub-language of OWL-DL on which reasoning is known to be sound, complete and decidable, and to take polynomial time (as described in B. Grosof, I. Horrocks, R Volz, and S. Decker. Description logic programs: combining logic programs with description logic. In WWW'03, pages 48-57, 2003, a copy of which is incorporated by reference herein in its entirety). Since OWL semantics does not cover reasoning on variables, we convert the variables into individuals that belong to a special concept called VariableIndividual and then do the inferences on them. Using this process, a graph pattern can be converted into a stream-graph for the purposes of reasoning.

We now introduce the concept of an expanded stream description. An expanded stream description contains a stream-graph that has been expanded with the results of reasoning. The expanded stream-graph, SG', is defined as the set of triples obtained as a result of doing reasoning on the original stream-graph, SG, based on an ontology, O. SG'=SG∪{t: BSG∪O|−$_{DLP}$t} where |−$_{DLP}$ is the logical derivation process of applying the DLP logic rules recursively on the triples in SG based on definitions in the ontology, O, until a fix point is reached. Also, we only include those triples in SG whose subject or object are an exemplar individual or exemplar literal that appears in SG.

As a result of reasoning, more triples, which describe further information about the exemplar individuals and literals defined in the stream graph, may be added to the expanded stream graph. For example, there are rules defined for DLP that allow making inferences based on subclass and subproperty relationships, symmetric, transitive and inverse property definitions, domain and range definitions, value restrictions, etc. These rules allow inferring many facts about a stream that are not contained in the stream description itself. For example, consider the stream produced by the data source 1010 in FIG. 10. The expanded stream graph 1030 includes additional inferences like_VoIP_Call_1 is of type VoIPCall (based on subclass relationships).

Generating SPPL Domain. After pre-reasoning, the expanded descriptions of sources and PEs are represented as an SPPL domain, and stored for later use in planning inquiries.

Translating Predicates, Constants and Facts. Each concept that is part of the expanded stream graph is mapped to an SPPL types. The subclass relationships between concepts are also captured in SPPL, which supports multiple inheritance. That allows us to map type constraints in the stream graph into SPPL type constraints on variables, thereby increasing the efficiency of the planner. One predicate is defined for each property (predicate) defined in the ontology. The list of const includes the definitions of all literals and exemplars defined in the expanded stream graph. Finally, the facts are generated for all ground assertions in the ontology that are defined on any non-exemplar individuals that appear in the stream graph.

Translating PEs and Data Sources. Each PE and Data Source is translated into an action. For a PE, each input stream requirement and each configuration parameter is translated into a precondition. Each output stream is translated into an effect. A data source has only one effect, which is based on the stream it produces. In order to obtain the list of predicates for the preconditions and effects, the SPPL Generator traverses the stream-graphs and obtains all constraints on the exemplars and variables. For example, the PE 1110 in FIG. 11, is represented in SPPL as:

```
(:action StreamProtocolAnalyzer
(:parameters ?Duration - xs:Duration
    ?VoIP_CallAudioSegment_1 - VoIPAudioSegment
    ?VoIP_CallChannel_1 - VoIPCallChannel
    ?StartTime - xs:dateTime )
(:precondition (contains ?VoIP_CallAudioSegment_1)
    (conveyedVia ?VoIP_CallAudioSegment_1
        ?VoIP_CallChannel_1)
    (hasStart ?VoIP_CallAudioSegment_1 ?StartTime)
    (hasDuration ?VoIP_CallAudioSegment_1 ?Duration)
    (hasFormat ?VoIP_CallAudioSegment_1 com.egs.rtp))
(:effect (contains ?VoIP_CallAudioSegment_1)
    (contains ?StartTime)
    (contains __EndTime)
    (contains ?VoIP_CallChannel_1)
    (conveyedVia ?VoIP_CallAudioSegment_1
        ?VoIP_CallChannel_1)
    (hasFormat ?VoIP_CallAudioSegment_1 com.egs.rtp)
    (hasFormat ?VoIP_CallAudioSegment_1 com.egs.VoIPChannel)
```

(hasStart ?VoIP_CallAudioSegment_1 ?StartTime)
(hasEnd ?VoIP_CallAudioSegment_1 ?EndTime)))

Semantic Planning

ISL received by the planner is translated into an SPPL problem. A goal statement is generated for each goal of the inquiry. The planner operates in two phases: a presolve phase and the plan search phase. During the plan search phase the planner performs ranch-and-bound forward search by connecting all compatible PEs to streams produced by already added PEs, or available from sources, and then selecting Pareto optimal solutions that match to specified inquiry goals. The planning problem that requires at least one of resource or security optimization is NP-hard for fixed maximum processing graph size (as described in M. Lelarge, Z. Liu and A. Riabov. Automatic composition of secure workflows. In ATC-06, 2006). Hence, worst case plan search time can be exponential in the number of PEs and sources. However, during the presolve phase the planner analyzes the problem structure and complements the search with efficient polynomial time algorithms when possible. Also during presolve analysis the sources that cannot contribute to the inquiry are eliminated, to help restrict the search only to relevant PEs and sources. After the presolve phase is done, the planner uses branch-and-bound search to construct optimal plans (as described in A. Riabov and Z. Liu. Planning for stream procession systems. In AAAI'05, July 2005).

When the planner attempts to connect a stream to a PE as input, it tries to match the expanded stream-graph of the stream, SG, obtained after pre-reasoning, with the graph pattern, GP, which describes a PE's input requirement. Since reasoning has already been done, the matching reduces to a subgraph-matching problem, i.e., "car the graph describing the input stream-pattern be embedded in the graph describing the stream-graph after some substitution of the variables in the stream-pattern?". The planner attempts to find a solution, $\theta$, such that $\theta$ (GP) is a sub-graph of SG', i.e. $\theta (GP) \subseteq SG'$. If it is able to find such a solution, then the graph-pattern is matched by the stream-graph. In SPPL, the graph pattern is represented as a precondition of a PE, and the stream-graph is set of streams that the planner has already produced. Hence, it tries to find appropriate substations of the variables of an SPPL action so that all preconditions are met.

The SPPL model yields a recursive formulation of the planning problem, where inquiry goals are expressed similarly to PE input requirements, and PE outputs are described similarly to data sources. That enables our system to reuse partial results: we store the descriptions of PE outputs in a deployed inquiry graph as computed by the planner, and later use those descriptions as sources in planning other inquiries.

Compiler Performance

Scalability of our approach depends on the ability of the compiler to handle data sources and PEs in large numbers and described by large ontologies. To evaluate compiler performance, we measured inquiry planning time on increasingly large randomly generated sets of PEs and data sources. Experiments were carried out on a 3 GHz Intel Pentium 4 PC with 500 MB memory. A locally deployed IBM DB2 database server was used as a repository for ontologies.

We generated random directed acyclic plan graphs, and then generated one PE for each of the nodes of the graph. We modeled data sources by corresponding source PEs, and counted them together with other types of PEs. The DAGs were generated by distributing the nodes randomly inside a unit square, and creating an arc from each node to any other node that has strictly higher coordinates in both dimensions with probability 0.4. The link is established from an existing output port (if one exists) with probability 0.5, otherwise a new port is created, and an input port is created for every incoming link. The resulting connected components are then connected to a single output node.

The semantic formulation for each of the randomly generated problem instances were created by assigning semantic descriptions to all streams and, consequently, to PEs. To ensure that the planner recreates the plan graph, we assigned unique types of information to each output of each PE, and required the type in corresponding PE inputs. The stream descriptions were in the form of randomly picked ABox assertions based on a financial services ontology that had about 200 concepts, 80 properties and 6000 individuals. The results of planning time measurements in seconds for the described Experiment 1 are presented in a table 1200 shown in FIG. 12. The table 1200 has columns for the number of streams and PEs in the generated graph, as well as time measurements for the online and offline phases of semantic planning.

In Experiment 1 all generated PEs were used in the same plan. In practice, however, the processing graphs are likely to be of relatively small sizes, but there could be many PEs that are not used in the produced processing graph. To model this scenario, we generated a large number of PEs, with only two candidate plans graphs of six nodes each. The planning times are presented in Experiment 2 of the table 1200.

The experiments show that there is a noticeable overhead associated with taking semantic information into account during planning. Our pre-reasoning approach, nevertheless, makes semantic planning practical by improving planner scalability. Although pre-reasoning is time consuming, the results of pre-reasoning can be shared between multiple inquiries. Therefore, the observed response time of the planning system in practice is close to planning phase time.

Deployed Sample Applications

We experimented the compiler on various applications. We describe two of them here, and use them to show case the automatic composition.

Enterprise Global Services

Figure 13:
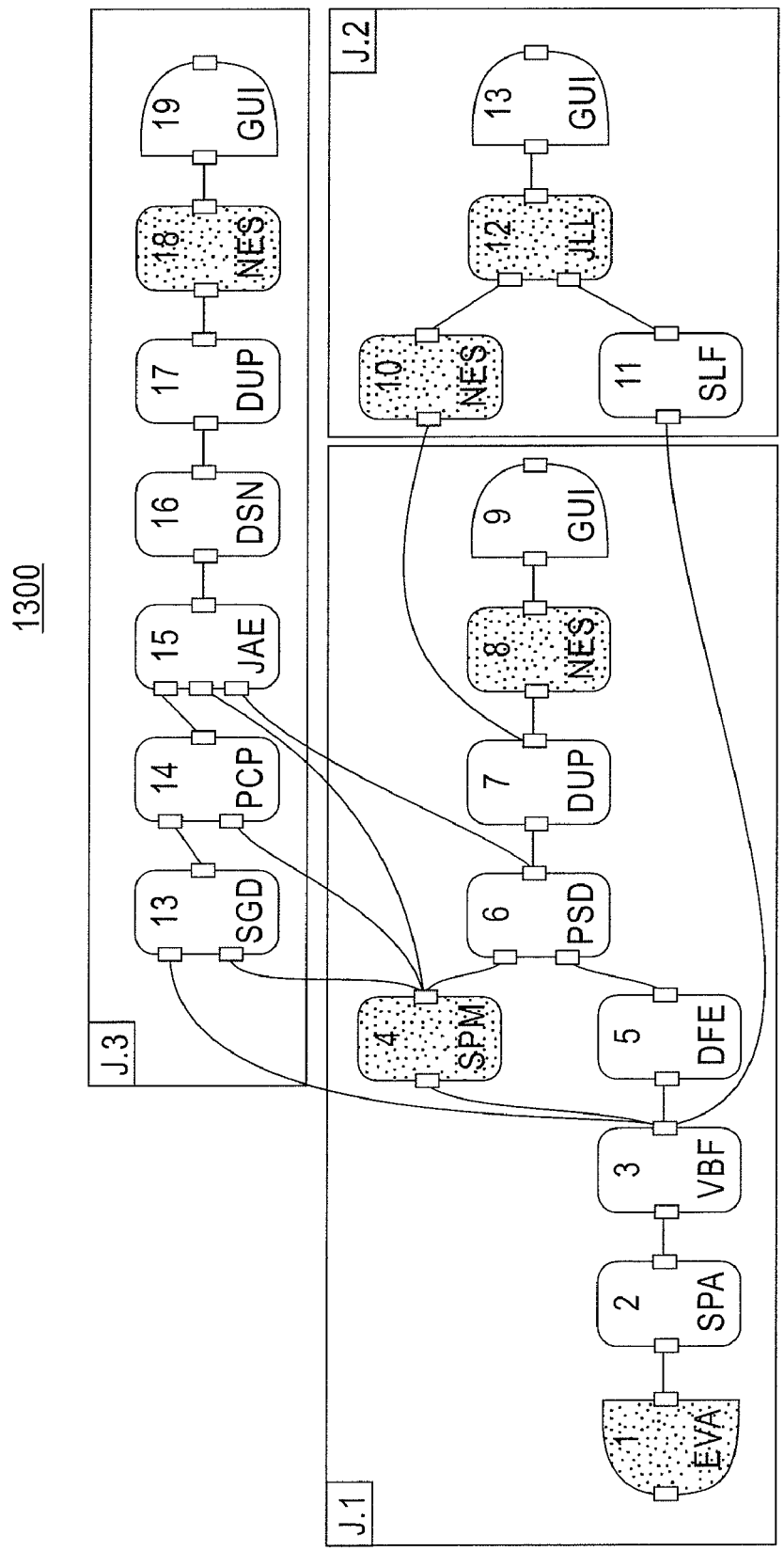
FIG. 13 illustrates a stream processing graph created according to an exemplary embodiment of the present invention.

FIG. 13 illustrates a processing graph 1300 created from three consecutive inquiries in the EGS domain ontology described above. In this example, we assume that the only data source available to the application are the raw VoIP packets of ongoing service calls.

The first application (J1) notifies the inquirer when employee Bob is sighted. The application receives raw data of multiplexed VoIP channels into its source PE, and returns a stream of sighted employees (Bob) with their active VoIP channels ids. Individuals that cannot be identified by the application are considered to be unnamed customers.

The second inquiry finds the geographic locations of the calls. The application depicted in FIG. 13 (J2) consists of a PE that looks up the location of the VoIP ip address from a database, and merges the results to the unfiltered employees pro file computed by PE (7) of J1. We verify here that the compiler reuses the appropriate derived streams from the first application.

The third inquiry lists employees that are currently helping customers. The application, (J3) in FIG. 13, accomplishes this by pairing VoIP channels into bidirectional conversations, and selecting conversations between an employee and an unnamed customer using derived streams from (J1). The application pairs the VoIP channels that maximize a "listen while other is talking" pattern. Using only the IP addresses for pairing is not a viable alternative here, because VoIP are aggregated in the PSTN or a PBX before entering the IP network, and thus potentially hundreds of VoIP could have the same pair of addresses.

We measured planning and pre-reasoning times on twelve inquiries we developed for the EGS application. For individual inquiries we measured the time between submitting an inquiry and receiving back the processing graph in JDL format. The experiments were performed in the same environment as described above in the Compiler Performance section, with INQ running as a server via an RMI interface. The results for inquiries J1, J2 and J3 are 4.80 s, 4.23 s, and 4.68 s respectively. The pre-reasoning time for all the inquiries was 126 s. Other inquiries include the employee courtesy level, the customer satisfaction level, and the quality of the VoIP (packet loss and bandwidth). All inquiries were compiled within 4 to 5 seconds.

To estimate the effort required for building the descriptions we measure how many ontology artifacts were created for the EGS example. In a table 1400 shown in FIG. 14 we provide numbers for the most complex PEs (JLL, JSC) and the data source VoIP_DataSource (DS1), as well as the total over the entire ontology.

Realtime Traffic Services

Realtime Traffic Services (RTS) provide routing services for a vehicle fleet based on continuous assessments of traffic conditions. RTS receives the GPS information of the vehicles, their assigned destinations, and uses a road-map updated with real-time traffic condition to decide of the best routes for the vehicles.

Figure 15:
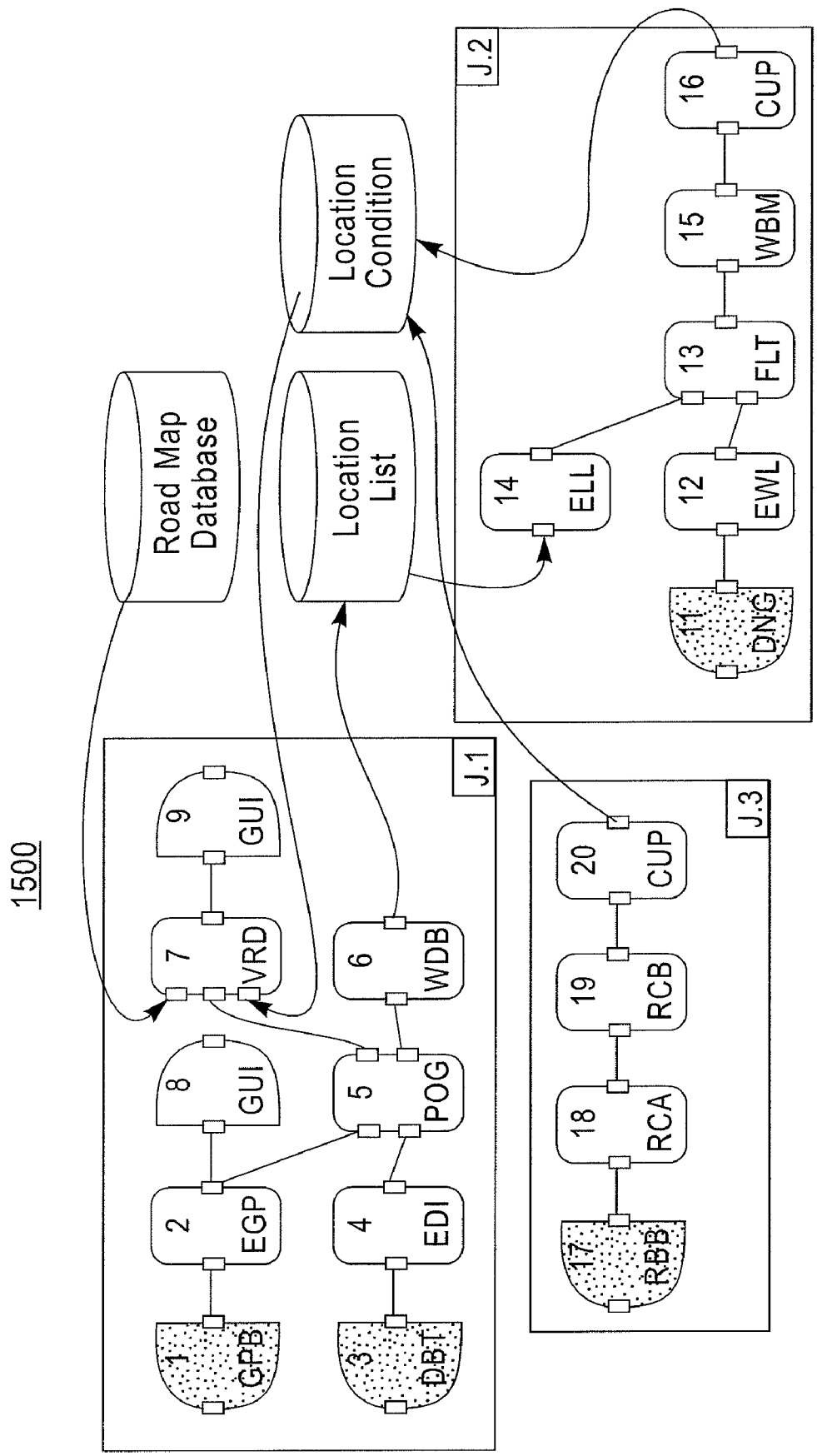
FIG. 15 illustrates a stream processing graph created according to an exemplary embodiment of the present invention.

A sample of an RTS flowgraph 1500 is illustrated in FIG. 15. The upper application depicts the route decision inquiries, and the lower applications depict the location condition update inquiries.

In the route decision application the PEs receive the streaming GPS data from the vehicles and their destinations. The PEs generate potential travel corridors, and decide on routes based on traffic conditions from the Location Condition store. The two main results of these inquiries are route updates for the vehicles and updates to the list of currently active locations, which guide the focus of the condition-assessment inquiries (in the lower part of the graph 1500).

The lower section contains an inquiry per known data source, a route incident RSS in the lower left, and a weather sensor network in the lower right. The applications draw data from the sources, process the data to determine conditions, and update a Location Conditions store. This data is retained for some limited duration and triggers rerouting in the upper inquiries. In some cases the application limits the amount of processing by focusing on anticipated travel corridors recorded in the Location List store. In this example the compiler composes the route decision and the location condition update inquiries independently. For instance, several route selection PEs can be deployed to handle separate fleets of vehicles. Similarly, additional applications can be deployed to update the location conditions with new modalities that improve the accuracy of the location condition.

It should also be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for assembling stream processing graphs in a stream processing system, comprising:
    performing, in an offline manner, translating a plurality of processing element and data source descriptions into a planning language and performing reasoning on the plurality of processing element and data source descriptions during the translation; and
    performing, in an online manner, receiving a processing request that specifies a desired processing outcome; translating the processing request into a planning goal; and
    assembling a plurality of stream processing graphs, each of the processing graphs including a plurality of the translated and reasoned processing elements or data sources that satisfy the desired processing outcome,
    wherein a first processing element description includes:
    an input message pattern that includes variables representing data objects that must be included in a message input to the first processing element, and a graph pattern that semantically describes the data objects that must be included in the message input to the first processing element.

2. The method of claim 1, wherein of the first processing element description includes:
    an output message pattern that includes variables and new data objects, the variables and new data objects representing data objects that must be included in a message output from the first processing element, and a graph pattern that semantically describes the data objects in the message output from the first processing element.

3. The method of claim 2, wherein a first data source description includes:
    an output message description that includes exemplar terms representing data objects that must be included in a message output from the first data source, and a graph that semantically describes the data objects in the message output from the first data source.

4. The method of claim 3, wherein assembling each of the stream processing graphs comprises:
matching a message output from the first processing element or the first data source to an input message pattern of a second processing element if the message includes the data objects that must be included in a message input to the second processing element and if a graph that semantically describes data objects in the message satisfies the graph pattern that semantically describes the data objects that must be included in the message input to the second processing element.

5. The method of claim 4, wherein the message is matched to the input message pattern of the second processing element by applying a pattern solution defined on all the variables in the graph pattern that semantically describes the data objects that must be included in the message input to the second processing element.

6. The method of claim 5, wherein when applying the pattern solution, variables that are substituted in the graph pattern that semantically describes the data objects that must be included in the message input to the second processing element become a subset of the data objects in the output message pattern of the second processing element after matching the message to the second processing element.

7. The method of claim 6, wherein a graph that is obtained after substituting the variables in the graph pattern that semantically describes the data objects that must be included in the message input to the second processing element is satisfied by the graph that semantically describes the data objects in the output message pattern of the second processing element after matching the message to the second processing element based on a logical derivation framework.

8. The method of claim 7, further comprising:
substituting variables representing configuration parameters of the second processing element by terms that satisfy constraints on the variables in variables in the graph pattern that semantically describes the data objects that must be included in the message input to the second processing element.

9. The method of claim 4, further comprising:
connecting the first processing element or the first data source to the second processing element when the message is matched to the input message pattern of the second processing element.

10. The method of claim 9, further comprising:
generating an output message of the second processing element by applying differences between the graph pattern that semantically describes the data objects that must be included in the message input to the second processing element and the graph pattern that semantically describes the data objects that must be in an output message pattern of the second processing element to the graph that semantically describes the data objects in the message.

11. The method of claim 10, further comprising:
adding and removing subgraphs from the message matched to the input message pattern of the second processing elements based on differences between the input message pattern of the second processing element and the output message pattern of the second processing element.

12. The method of claim 1, wherein the reasoning is Description Logic (DL) reasoning.

13. A method for assembling stream processing graphs in a stream processing system, comprising:
performing, in an offline manner, translating a plurality of processing element and data source descriptions into a planning language and performing reasoning on the plurality of processing element and data source descriptions during the translation; and
performing, in an online manner, receiving a processing request that specifies a desired processing outcome; translating the processing request into a planning goal; and assembling a plurality of stream processing graphs, each of the processing graphs including a plurality of the translated and reasoned processing elements or data sources that satisfy the desired processing outcome
wherein when a first stream processing graph of the plurality of stream processing graphs includes a first data source and a first processing element that satisfy the desired processing outcome and a second stream processing graph of the plurality of stream processing graphs includes the first data source and a second processing element that satisfies the desired processing outcome, the method further comprises:
selecting which of the first or second processing graphs is to be deployed in a stream processing system,
wherein the stream processing graph to be deployed is selected based on Pareto optimality of the stream processing graph.

14. A method for assembling stream processing graphs in a stream processing system, comprising:
performing, in an offline manner, translating a plurality of processing element and data source descriptions into a planning language and performing reasoning on the plurality of processing element and data source descriptions during the translation; and
performing, in an online manner, receiving a processing request that specifies a desired processing outcome; translating the processing request into a planning goal; and assembling a plurality of stream processing graphs, each of the processing graphs including a plurality of the translated and reasoned processing elements or data sources that satisfy the desired processing outcome
wherein when a first stream processing graph of the plurality of stream processing graphs includes a first data source and a first processing element that satisfy the desired processing outcome and a second stream processing graph of the plurality of stream processing graphs includes a second data source and the first processing element that satisfy the desired processing outcome, the method farther comprises:
selecting which of the first or second stream processing graphs is to be deployed in a stream processing system,
wherein the stream processing graph to be deployed is selected based on Pareto optimality of the stream processing graph.

15. A system for assembling stream processing graphs in a stream processing system, comprising:
a memory device for storing a program;
a processor in communication with the memory device, the processor operative with the program to:
perform, in an offline manner, translating a plurality of processing element and data source descriptions into a planning language and performing reasoning on the plurality of processing element and data source descriptions during the translation; and
perform, in an online manner, receiving a processing request that specifies a desired processing outcome; translating the processing request into a planning goal;

and assembling a plurality of stream processing graphs, each of the processing graphs including a plurality of the translated and reasoned processing elements or data sources that satisfy the desired processing outcome, wherein a first processing element description includes:

an input message pattern that includes variables representing data objects that must be included in a message input to the first processing element, and a graph pattern that semantically describes the data objects that must be included in the message input to the first processing element.

16. The system of claim 15, wherein the first processing element description includes:

an output message pattern that includes variables and new data objects, the variables and new data objects representing data objects that must be included in a message output from the first processing element, and a graph pattern that semantically describes the data objects in the message output from the first processing element.

17. The system of claim 16, wherein a first data source descriptions includes:

an output message description that includes exemplar terms representing data objects that must be included in a message output from the first data source, and a graph that semantically describes the data objects in the message output from the first data source.

18. The system of claim 17, wherein when assembling each of the stream processing graphs the processor is further operative with the program to:

match a message output from the first processing element or the first data source to an input message pattern of a second processing element if the message includes the data objects that must be included in a message input to the second processing element and if a graph that semantically describes data objects in the message satisfies the graph pattern that semantically describes the data objects that must be included in the message input to the second processing element.

19. The system of claim 18, wherein the message is matched to the input message pattern of the second processing element by applying a pattern solution defined on all the variables in the graph pattern that semantically describes the data objects that must be included in the message input to the second processing element.

20. The system of claim 19, wherein when applying the pattern solution, variables that are substituted in the graph pattern that semantically describes the data objects that must be included in the message input to the second processing element become a subset of the data objects in the output message pattern of the second processing element after matching the message to the second processing element.

21. The system of claim 20, wherein a graph that is obtained after substituting the variables in the graph pattern that semantically describes the data objects that must be included in the message input to the second processing element is satisfied by the graph that semantically describes the data objects in the output message pattern of the second processing element after matching the message to the second processing element based on a logical derivation framework.

22. The system of claim 21, wherein the processor is further operative with the program to:

substitute variables representing configuration parameters of the second processing element by terms that satisfy constraints on the variables in variables in the graph pattern that semantically describes the data objects that must be included in the message input to the second processing element.

23. The system of claim 18, wherein the processor is further operative with the program to:

connect the first processing element or the first data source to the second processing element when the message is matched to the input message pattern of the second processing element.

24. The system of claim 23, wherein the processor is further operative with the program to:

generate an output message of the second processing element by applying differences between the graph pattern that semantically describes the data objects that must be included in the message input to the second processing element and the graph pattern that semantically describes the data objects that must be in an output message pattern of the second processing element to the graph that semantically describes the data objects in the message.

25. The system of claim 24, wherein the processor is further operative with the program to:

add and remove subgraphs from the message matched to the input message pattern of the second processing elements based on differences between the input message pattern of the second processing element and the output message pattern of the second processing element.

26. The system of claim 15, wherein when a first stream processing graph of the plurality of stream processing graphs includes a first data source and the first processing element that satisfy the desired processing outcome and a second stream processing graph of the plurality of stream processing graphs includes the first data source and a second processing element that satisfies the desired processing outcome, the processor is further operative with the program to:

select which of the first or second processing graphs is to be deployed in a stream processing system.

27. The system of claim 26, wherein the stream processing graph to be deployed is selected based on Pareto optimality of the stream processing graph.

28. The system of claim 15, wherein when a first stream processing graph of the plurality of stream processing graphs includes a first data source and the first processing element that satisfy the desired processing outcome and a second stream processing graph of the plurality of stream processing graphs includes a second data source and the first processing element that satisfy the desired processing outcome, the processor is further operative with the program to:

select which of the first or second stream processing graphs is to be deployed in a stream processing system.

29. The system of claim 28, wherein the stream processing graph to be deployed is selected based on Pareto optimality of the stream processing graph.

30. The system of claim 15, wherein the reasoning is Description Logic (DL) reasoning.

31. A computer program product comprising a computer useable medium having computer program logic recorded thereon for assembling stream processing graphs in a stream processing system, the computer program logic comprising:

program code for performing, in an offline manner, translating a plurality of processing element and data source descriptions into a planning language and performing reasoning on the plurality of processing element and data source descriptions during the translation; and program code for performing, in an online manner, receiving a processing request that specifies a desired processing outcome; translating the processing request into a planning goal; and assembling a plurality of stream processing graphs, each of the processing graphs including a plurality of the translated and reasoned processing elements or data sources that satisfy the desired processing outcome, wherein a first processing element description includes:

an output message pattern that includes variables and new data objects, the variables and new data objects representing data objects that must be included in a message output from the first processing element, and a graph pattern that semantically describes the data objects in the message output from the first processing element.

* * * * *